United States Patent [19]

Honjo et al.

[11] Patent Number: 4,811,049
[45] Date of Patent: Mar. 7, 1989

[54] ORIGINAL FEEDING APPARATUS

[75] Inventors: Takeshi Honjo, Kawasaki; Naomi Takahata, Yokohama, both of Japan

[73] Assignee: Canon Kabushiki Kaisha, Tokyo, Japan

[21] Appl. No.: 632,312

[22] Filed: Jul. 18, 1984

[30] Foreign Application Priority Data

| Jul. 22, 1983 | [JP] | Japan | 58-134832 |
| Jul. 22, 1983 | [JP] | Japan | 58-134833 |
| Jul. 22, 1983 | [JP] | Japan | 58-134834 |
| Jul. 22, 1983 | [JP] | Japan | 58-134835 |
| Jul. 22, 1983 | [JP] | Japan | 58-134836 |

[51] Int. Cl.⁴ .............................. G03G 15/00
[52] U.S. Cl. ........................ 355/14 SH; 355/3 SH; 355/24; 271/3.1; 271/65
[58] Field of Search .......... 355/3 SH, 14 SH, 14 C, 355/23, 24; 271/3, 3.1, 4, 8.1, 9, 65, 256, 264, 265, 287

[56] References Cited

U.S. PATENT DOCUMENTS

| 4,089,515 | 5/1978 | Stange et al. | 355/24 X |
| 4,176,945 | 12/1979 | Holzhauser et al. | 355/14 SH X |
| 4,332,954 | 6/1982 | Phelps | 355/14 SH |
| 4,428,666 | 1/1984 | Phelps et al. | 355/14 SH |
| 4,456,237 | 6/1984 | Buddendeck | 271/3.1 |
| 4,561,765 | 12/1985 | Masuda | 355/3 SH X |
| 4,561,772 | 12/1985 | Smith | 355/3 SH X |
| 4,607,948 | 8/1986 | Naito | 355/14 SH X |

Primary Examiner—A. C. Prescott
Assistant Examiner—Jane Lau
Attorney, Agent, or Firm—Fitzpatrick, Cella, Harper & Scinto

[57] ABSTRACT

There is disclosed an automatic original feeder of an improved structure capable of functioning in a first mode in which the original is ejected after exposure and in a second mode in which the original is reversed between exposures of both sides before ejection.

12 Claims, 40 Drawing Sheets

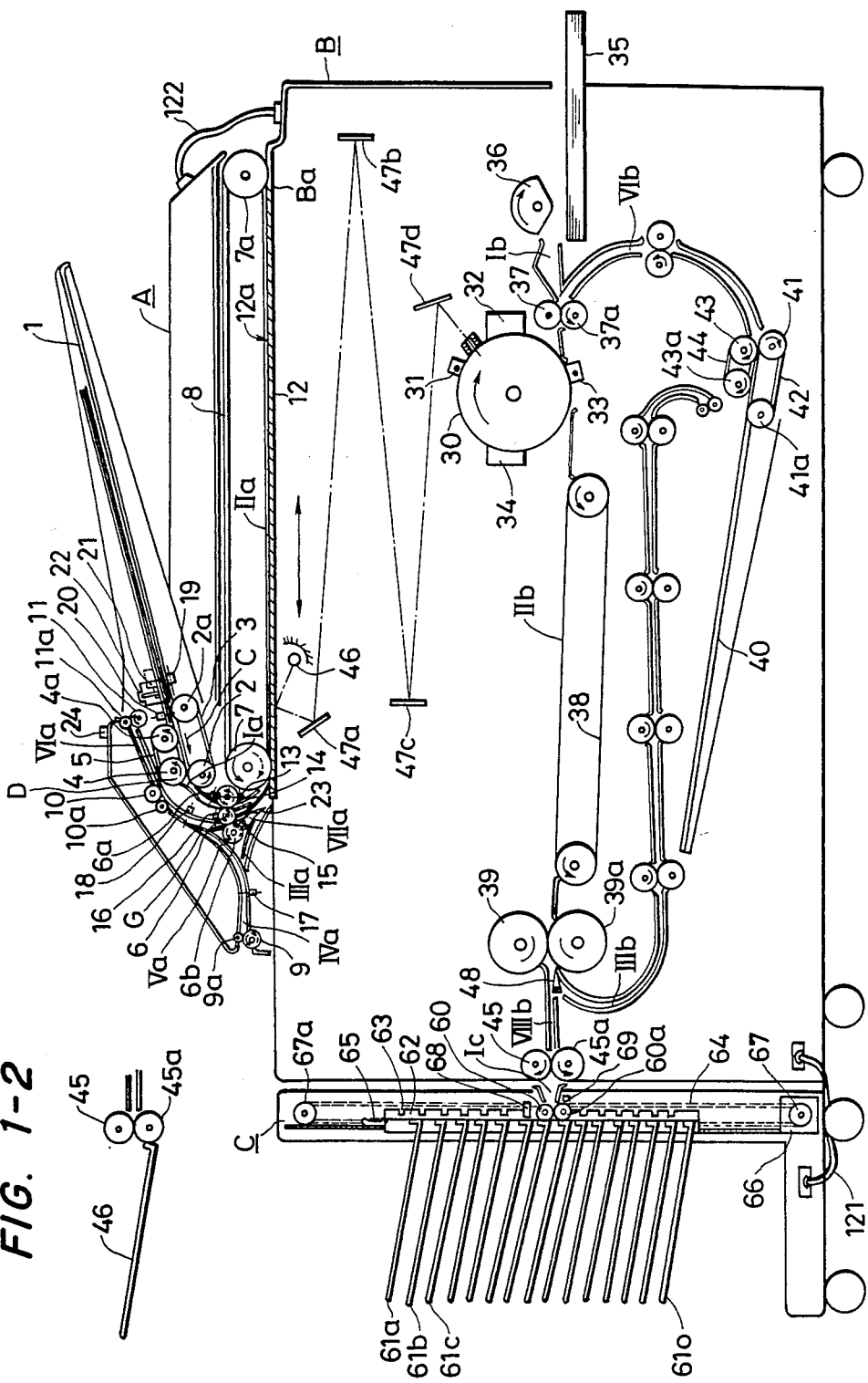

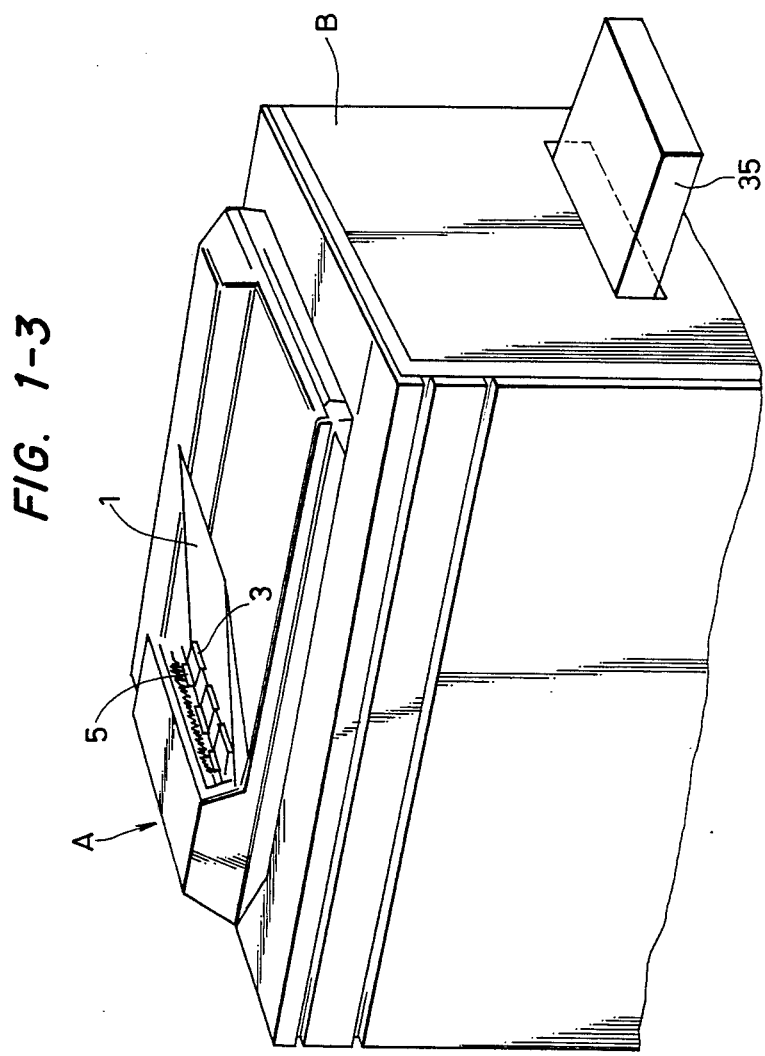

FIG. 8-1
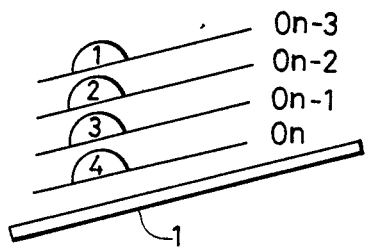
FIG. 8-2
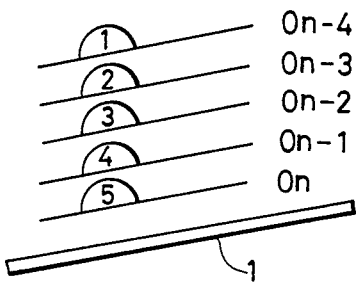
FIG. 9-1
(1)
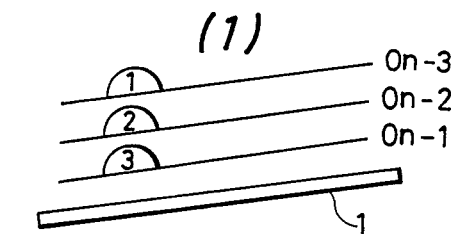
(2)
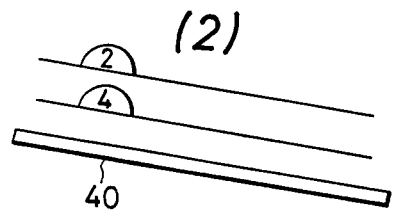
(3)
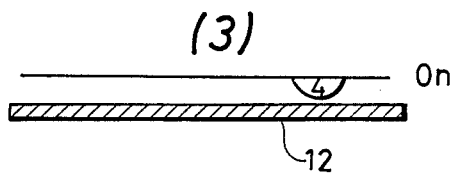

FIG. 9-2
(1)
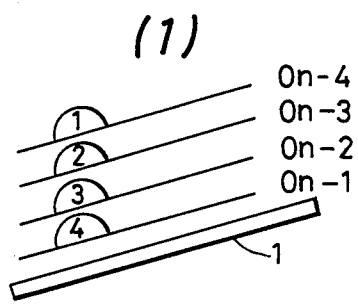
(2)
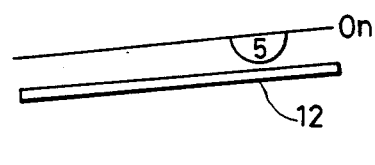
(3)
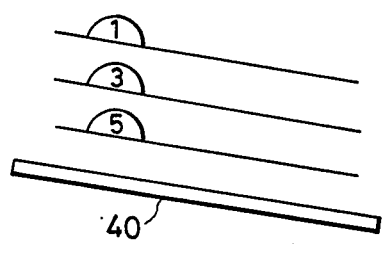
FIG. 10-1
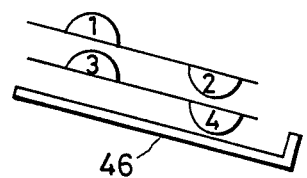
FIG. 10-2
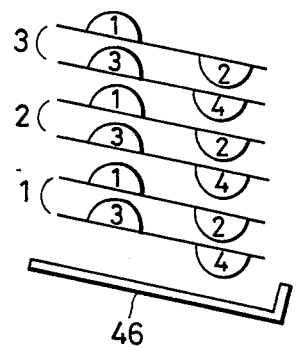
FIG. 10-3
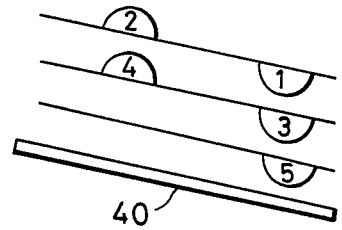

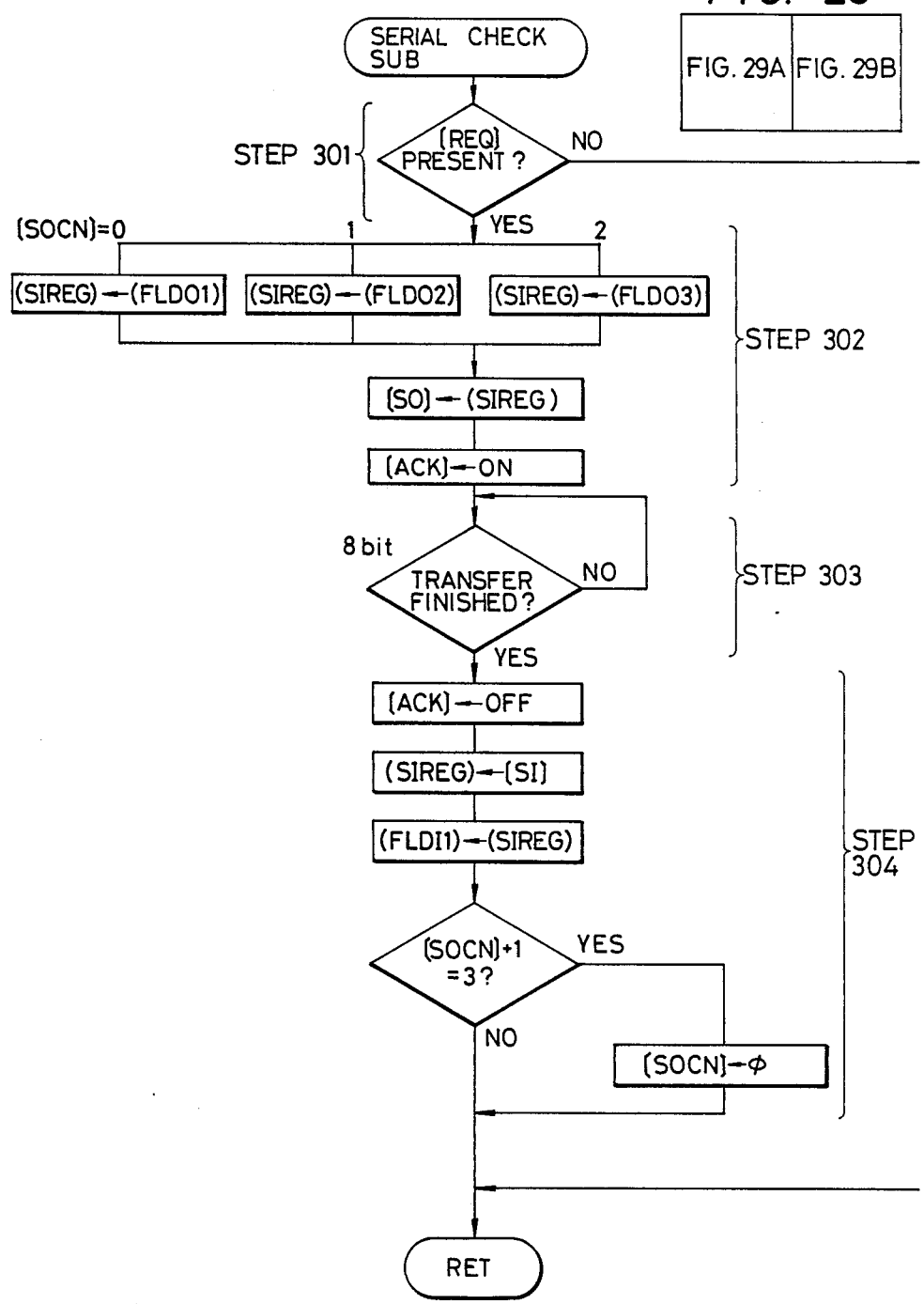

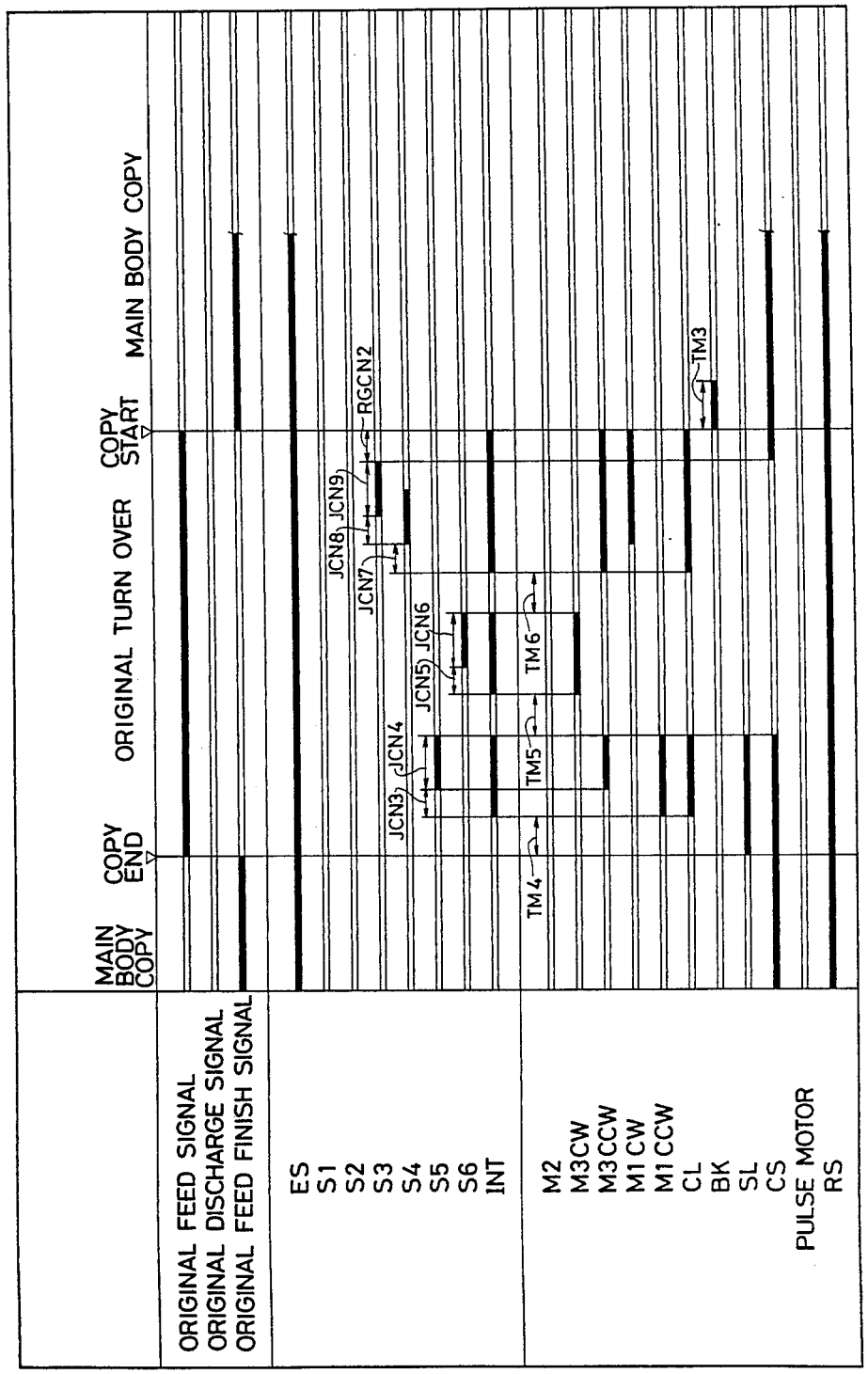

ORIGINAL FEEDING APPARATUS

BACKGROUND OF THE INVENTION

1. Field of the Invention

The present invention relates to an original feeding apparatus for feeding an original document to an exposure position and ejecting said original after exposure operation.

2. Description of the Prior Art

An automatic original feeding device is often employed in combination with an image forming apparatus such as copier.

Such device is used for example for enabling to copy an original printed on both faces thereof. However such conventional device involves complicated operations for achieving two-side copying with complicated signal transfer between the copier and the device attached thereto, thus inevitably leading to an increase in the number of signal lines, a complicated structure and a deteriorated reliability. Also a change in the specifications of the copier inevitably requires a change in the specifications of the attached device.

On the other hand, a simplified structure, if selected, prohibits the selection of various modes such as two-side copying from a two-sided original and two-side copying from a one-sided original.

Also in a two-side original feeding device, one of stacked plural two-side originals is supplied and stopped in a determined position on an original supporting glass of the copier or the like, and it is guided through a path different from the path of the above-mentioned supply in order to supply said original in inverted position again to the determined position on said original supporting glass, so that the two-side original is subjected to so-called switchback motion, namely a shift from forward motion to backward motion at the switching of the transport paths.

At such switchback operation the original often escapes the supporting rollers or assumes a diagonal position to the transport path, and the apparatus has to be made bulkier if a securer supporting mechanism is employed for avoiding the above-mentioned drawbacks.

Also in case of employing such original circulating device in combination with a two-side copier for making two-sided copies from plural one-side originals, it has been necessary to adopt different operating modes according to whether the number of pages of the originals is even or odd, in order that the pages are orderly arranged. In such device, therefore, it has been customary to once circulate the originals through the device prior to the copying operation in order to count the number of pages and to determined whether it is even or odd. Such method of use, however, not only requires unnecessarily long time for copying but also increases the probability of causing damages in the originals.

Also in case of employing such original circulating device for making plural sets of copies with orderly arranged pages, it has been necessary to circulate the originals plural times. Such operation requires excessively long copying time and tends to generate damages or jammings of the originals.

Besides, the electric power for such device is usually supplied from the copier itself, within the spare capacity of the power supply thereof. However, in recent years, the power supply to the attached device such as the original feeder is being gradually reduced since the above-mentioned spare capacity is being utilized for improving the performance, such as copying speed, of the copier. On the other there exists a contradicting requirement that an increased electric power supply is needed by the attached device in order to achieve highly advanced performance matching that of the copier itself. For this reason the designing of the entire system has become extremely difficult and cannot sometimes be brought to the commercial products.

Also, such device is usually composed of plural original transport means driven by separate power sources, a clock generator functioning in response to one of the transport means, plural original detectors etc. Thus, if the detection for example of the original size is conducted in the course of original transport by counting the clock signals from the clock generator, exact detection cannot be expected by the counting of one specy of clock signals since the amount or speed of movement of the original depends on the speed of each of said plural transport means.

SUMMARY OF THE INVENTION

In consideration of the foregoing, an object of the present invention is to provide an improved original feeding apparatus.

Another object of the present invention is to provide an original feeding apparatus capable of various operating modes with a simple structure.

Still another object of the present invention is to provide an original feeding apparatus with improved versatility.

Still another object of the present invention is to provide an original feeding apparatus of improved reliability.

Still another object of the present invention is to provide an original feeding apparatus capable of secure original transporting operation.

Still another object of the present invention is to provide an original feeding apparatus with a lowered electric power consumption.

Still another object of the present invention is to provide an original feeding apparatus enabling exact detection of the size of the original in transport.

Still another object of the present invention is to provide an improvement in an image forming system in which a copier is combined with an original feeding apparatus.

Still another object of the present invention is to provide an image forming system capable, in obtaining two-sided copies from one-sided originals, of copies in orderly arranged pages without increase in the copying time.

Still another object of the present invention is to provide an image forming system capable of reducing troubles such as jammings and damages in the originals in a copying operation by circulating originals.

The foregoing and still other objects of the present invention will become fully apparent from the following description.

BRIEF DESCRIPTION OF THE DRAWINGS

FIG. 1-1 is a cross-sectional view of an image forming system comprising a two-side original feeding apparatus, a two-side copier, and a sorter;

FIG. 1-2 is a schematic view of a discharge tray;

FIG. 1-3 is a perspective view of an image forming system comprising a two-side original feeding apparatus and a two-side copier;

FIG. 2 is a cross-sectional view showing the driving system of the two-side original feeding apparatus;

FIGS. 3 to 7, 8-1, 8-2, 9-1, 9-2, 10-1 to 10-3, 11, 12-1, 12-2 and 13-1 to 13-3 are schematic views showing the states of originals or copy sheets;

FIGS. 31 to 39 are timing charts in various modes of the two-side original feeding apparatus.

DETAILED DESCRIPTION OF THE PREFERRED EMBODIMENTS

Figures 1, 12:
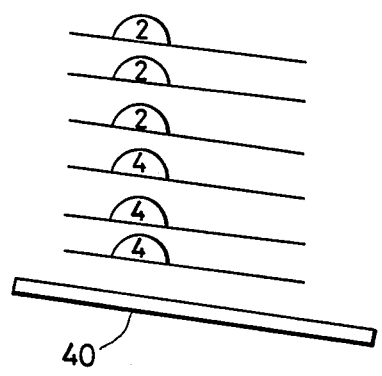
Figures 2, 12:
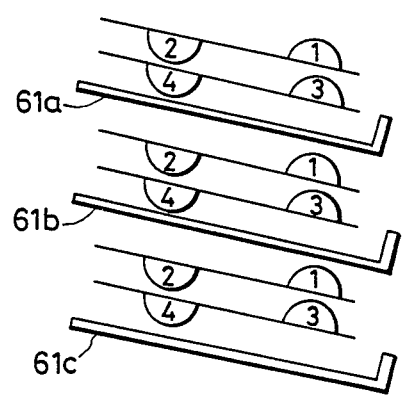

Now the present invention will be clarified in detail by embodiments shown in the attached drawings. FIG. 1-1 is a longitudinal cross-sectional view showing schematic structure of a two-sided copier embodying the present invention.

The copier of the present embodiment is principally composed of a two-side original feeding apparatus A, a copier body B incorporating a copy process device, and a sorter C for sorting the copy sheets, wherein the feeding apparatus A is placed on the upper plate of the casing of the copier B.

Figure 2:
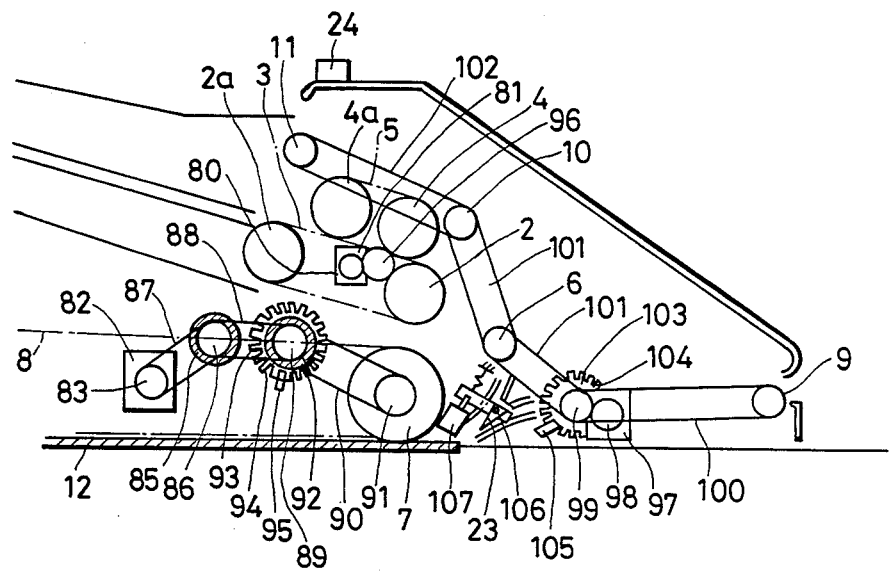
Figure 3:
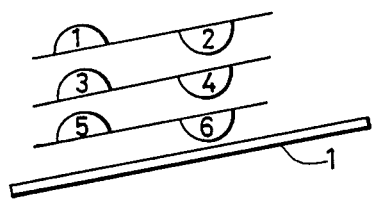

FIG. 1-3 is a perspective view showing a state of the two-side original feeding apparatus A mounted on the copier body B. An original carrier tray 1 supports a stack of originals O in an order that the last page is positioned at the bottom, with the image bearing faces thereof upwards. Said tray is inclined downward in the feeding direction of the originals so that the stacked originals are aligned toward said feeding direction.

(1) Two-side original feeding apparatus A:

There are provided an original carrier tray 1; a feeding belt driving shaft 2; a driven shaft 2a which is linked with said driving shaft 2 through a feeding belt 3 rotated in a direction C; a separating belt driving shaft 4 and a driven shaft 4a linked with said driving shaft 4 through a separating belt 5 rotated in a direction D. The plural sheet originals stacked on the original carrier tray are separated one by one from the bottom by means of the feeding belt 3 and the separating belt 5. There are also provided a transport roller 6; runner rolls 6a, 6b maintained in contact with the transport roller 6; other transport rollers 9, 10, 11; runner rolls 9a, 10a, 11a maintained in respective contact with the transport rollers 9, 10, 11; a conveyor belt driving roller 7 positioned close to the left-hand end of a platen glass 12 mounted in the upper plate Ba of the casing of the copier; a driven roller 7a positioned close to the right-hand end of said platen glass 12 and linked with said driving roller 7 through a belt 8 of which the lower surface is positioned quite close to or in contact with the upper face 12a of said platen glass 12; reflective photosensors 13 to 18 positioned in certain positions along the original feeding path in order to detect the leading or trailing end of the original; a reflective photosensor ES 20 for detecting the original placed on the original carrier tray 1; a reflective sensor RS 19 for detecting one cycle of the original stack, said sensor being turned on by a separating arm 22 when it is placed on the stacked original by a stepping motor 21 and turned off when said arm 22 is removed by the weight thereof when the trailing end of the last original is extracted therefrom at the end of successive original feedings; and a flexible guide G made for example of a polyester sheet and adhered at an end to the lateral wall of the sheet path in such a manner as to allow entry of the sheet into a path VIa but prohibit entry from said path VIa into a path IVa, thus guiding the sheet into a path VIIa.

(2) Copier B:

There are shown a platen glass 12; a photosensitive drum 30 rotated in a direction indicated by arrow about a shaft 30a; a charger 31; a developing unit 32; a transfer charger 33; a cleaner 34; a cassette 35 for storing copy sheets; a feeding roller 36 for feeding the copy sheets one by one from said cassette; registration rollers 37, 37a; a conveyor belt 38 for feeding the copy sheet after image transfer to fixing rollers 39, 39a; an intermediate tray 40 for storing the copy sheets after copying on one side thereof; driving and driven shafts 41, 41a for a feeding belt 42; driving and driven shafts 43, 43a for a separating belt 44 for re-feeding the copy sheets stored in the intermediate tray 40 from the bottom thereof; and discharge rollers 45, 45a for discharging the copy sheet after the copying operation into the sorter C, or, if the sorter C is not connected, to a sheet tray 46 as shown in FIG. 1-2.

(3) Sorter C:

There are provided a conveyor roller 60 and a pressure roller 60a for introducing the copy sheets from the copier B into bins 61a–61o; a fixing plate 62 for the bins 61a–61o, provided with notches 63, integrally formed with said bins 61a–61o and connected through a spring 65 to a chain 64 for vertical movement by means of rollers 67, 67a connected to a motor 66; and a photosensor 68 for detecting the bin position by detecting one of the notches 63 to identify a bin facing the discharge slot. There is further provided a photosensor 69 for starting the movement of bins after a time enough for complete storage of the copy sheet into a bin from the detection of the trailing end of the sheet and to terminate the movement of the bins upon detection of a succeeding notch 63, whereby the copy sheets supplied from the copier B in the course of a continuous copying operation are sorted in successive manner into the bins.

(4) Driving mechanism of the two-side original feeding apparatus A:

FIG. 2 is a schematic cross-sectional view of a driving unit, wherein shown are a motor (M2) 80; a motor gear 81 for transmitting the driving force to the feeding belt driving shaft 2 and the separating belt driving shaft 4 through a gear 96; a motor (M1) 82; a motor pulley 83; combined pulleys 86 for controlling the transmission of driving force from a belt 87 to a belt 88 through a magnetic clutch (CL) 85; integrally constructed pulleys 89 for transmitting the driving force from a belt 88 to a belt 90 thereby constantly driving the roller 7 of the conveyor belt 8 through a pulley 91; a disk 93 integrally rotated with said pulleys 89 and provided with notches 94 for detecting the amount of movement of the belt 8 by means of a photosensor 95; and a magnetic brake (BK) 92 capable of instantly stopping the belt 92 when energized.

There are further shown a motor (M3) 97; a gear 98; a pulley 99; belts 100, 101, 102 for transmitting the driving force to the conveyor rollers 6, 9, 10, 11; a disk 103 rotated integrally with the pulley 99 and provided with notches 104 for detecting the amount of rotation of the conveyor rollers 6, 9, 10, 11 or the amount of movement of the original by means of a photosensor 105; and a selector finger 23 movable about a shaft 106 for guiding the original from the platen glass 12 either to the conveyor roller 6 or to the conveyor roller 9 under the control of a solenoid (SL) 107.

Now there will be given an explanation on the function of the two-side original feeding apparatus A.

(i) Case of one-side copying from one-side originals (without sorter):

Plural one-sided sheet originals, arranged in the order of pages, are placed on the original carrier tray 1 shown in FIG. 1, with the first page facing upward. The stacked originals are separated and fed one by one from the bottom by means of the feeding belt 3 and the separating belt 5. The supplied original passes a path Ia and supplied onto the platen glass 12 with the image bearing face thereof downward by means of the conveyor belt 8. Upon detection of the rear end of said original by the sensor 14 (S2), there is initiated the counting of the notches 94 of the disk 93 (FIG. 2). The motor M1 (82) and the clutch CL (85) are turned off and the brake BK (92) is turned on, thereby instantly terminating the rotation of the conveyor belt 8. In this manner the original is automatically set in a determined position on the platen glass 12. The sensor 13 (S1) (FIG. 1-1) detects whether the original is separated in correct manner, and if it does not detect the original within a determined time after the start of separation, a sheet jamming is identified and the transportation is terminated.

Upon positioning of the original on the platen glass 12 in this manner, a feed finish signal (to be explained later) is supplied to the copier B to initiate the copying operation, whereby a toner image corresponding to the original image is formed on the photosensitive drum 30. On the other hand a copy sheet is supplied by the feeding roller 36 from the cassette 35 to a path Ib and the above-mentioned toner image is transferred thereon by the transfer charger 33. Then the sheet passes a path IIb, then the fixing rollers 39, 39a and a path VIIIb, and finally discharged to the tray 46. On the other hand the original, after an exposure step by a halogen lamp 46, and mirrors 47a, 47b, 47c, 47d, is discharged through paths VIIa, VIa. Simultaneously a succeeding original is supplied in parallel position in the aforementioned function, and is positioned on the platen glass 12.

Said parallel feed and discharge are defined as normal discharge and normal feed since both originals are merely circulated and are not inverted in the course of transportation. Upon detection, by the sensor RS (19), of a cycle of the original circulation by said normal-discharge and normal-feed steps in succession, a cycle end signal (to be explained later) is supplied to the copier B to store a count of the copies. The above-described procedure is repeated until said count reaches a predetermined number, and the copies of the required number are placed on the tray 46.

(ii) Case of one-side copying from one-side originals (with sorter):

The function is almost same as that in the above-explained case of one-side copying from one-side originals without sorter. However, in contrast to the aforementioned case without sorter C in which a normal discharge/feed operation is conducted for each exposure of the original, the exposure of each original is repeated, in the presence of the sorter C, by a number of times corresponding to the predetermined copy number and the copy sheets discharged in succession are stored in the bins 61a–61o of the sorter C. In this manner the use of the sorter C allows to obtain a predetermined number of copies in one circulation of the original.

Figure 4:
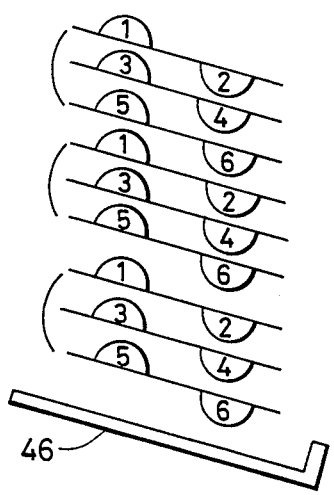
Figure 5:
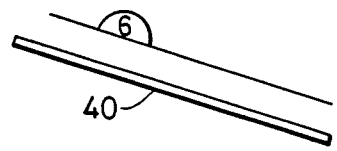

(iii) Case of two-side copying from two-side originals (without sorter):

In case three sheet originals are placed on the original carrier tray 1, the order of pages will be as shown in FIG. 3. In case of obtaining three copies from each original, the completed copies after copying operation are stacked on the tray 46 as shown in FIG. 4, and the originals are stacked same as in the original state shown in FIG. 3. In the following there will be explained the function in this case. At first, after an original of pages 5 and 6 is supplied onto the platen glass 12, the motors M1 (82), M3 (97) shown in FIG. 2 are reserved and the solenoid SL (107) is simultaneously energized to shift the sheet discharge path, whereby the original passes paths IIIa, IVa and is transported by the conveyor rollers 9, 9a. The motor M3 (97) is deactivated upon detection of the rear end of the original by the sensor S5 (17). After the lapse of a determined time the motor M3 (97) is rotated in the forward direction, whereby the original passes paths Va, VIa and is transported by the conveyor rollers 10, 10a, 11, 11a. The motor M3 (97) is stopped upon detection of the rear end of the original by the sensor S6 (18), and, after the lapse of a determined time, the motor M3 (97) is again rotated in the reverse direction while the motor M1 (82) is rotated in the forward direction and the solenoid SL (23) is energized whereby the original passes the path VIIa and is transported by the belt 8. Upon detection of the rear end of the original by the sensor S3 (15), there is initiated the counting of the notches 94 of the disk 93 shown in FIG. 2, and, upon arrival at a determined count, the motor M1 (82) is turned off while the clutch CL (85) is turned off and the brake BK (92) is turned on whereby the conveyor belt 8 is instantly stopped to set the original. In this manner there is at first conducted a reversed feed step, in which an original on the original carrier tray is supplied, with inversion, onto the platen glass 12. Thereafter the feed finish signal is supplied to the copier B. In the copier B the original image is copied on a copy sheet in the same manner as explained before, but the copy sheet discharged from the fixing rollers 39, 39a passes a path IIIb and placed on the intermediate tray 40 as shown in FIG. 5 since the finger 48 is shifted. After the exposure of the page 6, the original is subjected to a reversal step in which the original is guided through the paths IIIa, IVa, VIa and VIIa in order to place the page 5 of the original downward onto the platen glass 12. Then the feed completion signal is again supplied to the copier B to conduct copying operation for the page 5 thus forming the image thereof on the rear side of the copy sheet already bearing the image of the page 6 and placed on the intermediate tray 40, and said sheet is discharged onto the tray 46 with said image of the page 5 upwards. The original present on the platen glass 12 is subjected to a normal discharge step, in which the original is guided through paths VIIa, VIa and is discharged, with the page 5 upwards, on the originals stacked on the original carrier tray 1, by means of the conveyor rollers 11, 11a. At a certain time in the course of said normal discharge operation there is initiated the aforementioned reversed feed operation for a next original having pages 4 and 3 for placing said original, with the page 4 downwards, on the platen glass 12. Such simultaneous operations of normal discharge and reversed feed will hereinafter be called an reversed-feed and normal-discharge step. Thereafter the aforementioned copying cycle is repeated for a required number of times, so that the copy sheets are finally discharged on the tray 46 as shown in FIG. 4 while the originals are discharged and stacked on the original carrier tray 1 without any change in the initial order as shown in FIG. 3. In this manner obtained are two-side copies from two-side originals.

Figure 6:
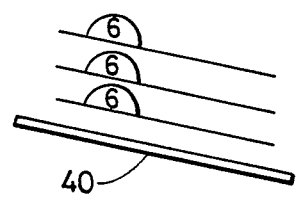
Figure 7:
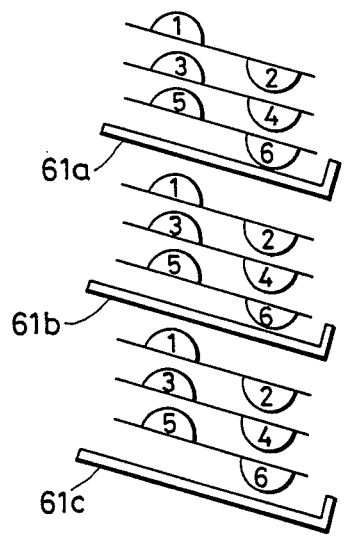

(iv) Case of two-side copying from two-side originals (with sorter):

The operation in this case is substantially same as that in the aforementioned case of two-side copying from two-side originals without sorter. However, in contrast to the case without the sorter in which a reversed-feed and normal-discharge operation for each exposure of the original, the exposure of the original is repeated for the predetermined copy number when the sorter C is employed, whereby the copy sheets are temporarily stored on the intermediate tray 40 as shown in FIG. 6 and are then supplied again for forming the images on the rear sides and sorted in successive manner in the sorter C. Thus the copy sheets are finally stored in the sorter C as shown in FIG. 7 and the originals are discharged in the same manner as in the initial state as shown in FIG. 3. The entire copying operation is completed in this manner.

(v) Case of two-side copying from one-side originals (without sorter):

It is assumed that the original carrier tray 1 supports n originals, with an uppermost original $O_1$ and a lowermost original $O_n$. The original setting is conducted in two ways, as shown in FIG. 8-1 or 8-2, according to whether n is odd or even. At first there is explained a case where n is even. At first reference is made to FIG. 8-1, and an original $O_n$ is supplied onto the platen glass 12 with the normal feed operation. While a copy sheet bearing the image of said original $O_n$ is stored in the intermediate tray 40, a normal-feed and normal-discharge operation is conducted to replace the original $O_n$ with $O_{n-1}$. The original $O_{n-1}$ is not copied, and a normal-feed-normal-discharge operation is conducted to replace the original $O_{n-1}$ with an original $O_{n-2}$. Then a copying operation is conducted on said original $O_{n-2}$ to store the resulting copy sheet in the intermediate tray 40, and a normal-feed normal-discharge operation is conducted to set a succeeding original $O_{n-3}$ on the platen glass 12. If said original $O_{n-3}$ is an original of the first page, the sensor RS (19) detects the separating arm 22 to supply a cycle end signal from the two-side original circulating apparatus A to the copier B, which thus identifies that the number of the originals is four and even. The original $O_{n-3}$ is not copied and is replaced with a succeeding original $O_n$ in a normal-feed normal-discharge operation, whereby the original $O_n$ is set on the platen glass 12. At this point the originals and the copy sheets assume a state as shown in FIG. 9-1, (1) to (3).

Then the original $O_n$ is not copied and is replaced with the original $O_{n-1}$ in a normal-feed normal-discharge operation, whereby the original $O_{n-1}$ is placed on the platen glass 12 and the image thereof, i.e. page 3, is copied onto the rear side of a copy sheet already bearing the image of page 4, which is supplied from the bottom of the copy sheets stacked on the intermediate tray 40 and already having images on one sides thereof. The completed copy is discharged onto the tray 46. The above-described procedure is thereafter repeated, wherein the original $O_{n-2}$ is not copied and the original $O_{n-3}$ is copied onto the rear side of a copy sheet already bearing the page 2 and stored in the intermediate tray 40. In this manner a set of copy sheets bearing images on both sides thereof is discharged as shown in FIG. 10-1. The above-described procedure is repeated for the predetermined copy number. In case three sets are required for example, the obtained copy sheets are finally stacked as shown in FIG. 10-2 while the originals are stacked in the initial state as shown in FIG. 8-1 at the end of the entire copying operation.

Figure 11:
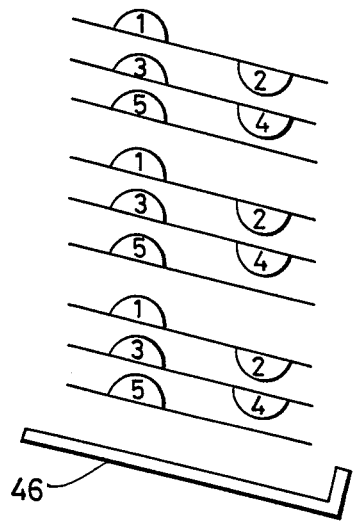

Now there will be explained a case wherein the number n of the originals is odd as shown in FIG. 8-2. In the same manner as in the foregoing case, there is repeated a procedure of copying an original $O_n$ to store the resulting copy in the intermediate tray 40, skipping a succeeding original $O_{n-1}$, then copying an original $O_{n-2}$ to store the resulting copy in the intermediate tray 40, skipping an original $O_{n-3}$ and copying an original $O_{n-4}$ to store the resulting copy in the intermediate tray 40, and, in the course of replacing the original $O_{n-3}$ with $O_{n-4}$, the copier B identifies, by the cycle end signal from the two-side original circulating apparatus A, that the number of originals is five and odd. Subsequently the original $O_{n-4}$ is replaced with the original $O_n$ whereby the original $O_n$ is set on the platen glass 12. At this point the originals and copy sheets assume a state as shown in FIG. 9-2, (1) to (3). Then the original $O_n$ is not copied and is replaced with the original $O_{n-1}$ by a normal-feed normal-discharge operation. Simultaneously with said replacement, the copy sheet already bearing the image of page 5, which has been stored in the intermediate tray 40, is circulated through paths VIb, IIb and IIIb and is placed on top of the copy sheets stacked on the intermediate tray 40. Then the original $O_{n-1}$ is copied onto the rear side of the copy sheet already bearing the image of page 3, which is then placed on top of the copy sheets on the intermediate tray 40 through the above-mentioned circulating paths. Simultaneously with said circulation the original $O_{n-1}$ is replaced with the original $O_{n-2}$, which is thus placed on the platen glass 12. The original $O_{n-2}$ is not copied, then the original $O_{n-3}$ is copied on the rear side of the copy sheet already bearing image of the page 1 and the obtained copy sheet is again stored in the intermediate tray 40. The original $O_{n-4}$ is not copied, and, at this point, the copy sheets assume a state as shown in FIG. 10-3. Thereafter the copy sheets on the intermediate tray 40 are in succession discharged from the bottom to the tray 46 through paths VIb, IIb and VIIIb, thus providing a set of completed copies. The above-described procedure is repeated for the predetermined copy number. In case said number is equal to three, there will be finally obtained copy sheets as shown in FIG. 11 while the originals are stacked in the initial state as shown in FIG. 8-2 at the end of the entire copying operation.

Figures 1, 13:
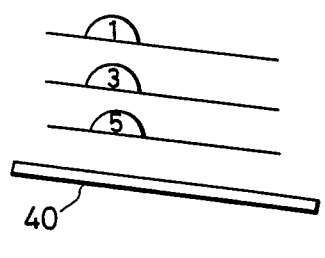
Figures 2, 13:
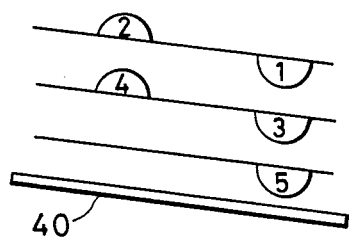
Figures 3, 13:
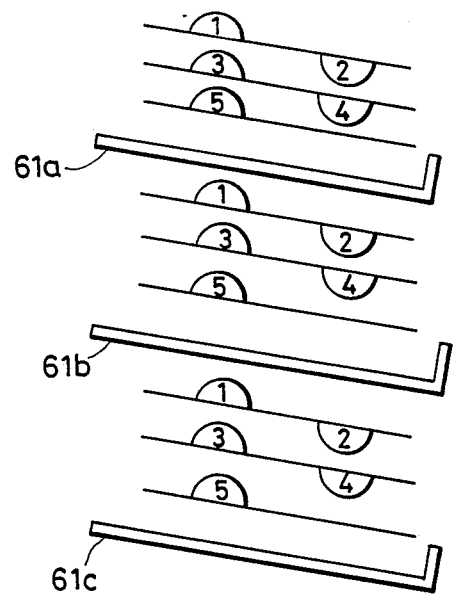

(vi) Case of two-side copying from one-side originals (with sorter):

In contrast to the foregoing case (v) of two-side copying from one-side originals without sorter in which a normal-feed normal-discharge operation is conducted for each exposure of the original, the exposure in the present case with sorter is repeated for the predetermined copy number for each original. As an example, in case of making three copies from four originals as shown in FIG. 8-1, even pages are at first copied and the obtained copy sheets are temporarily stored on the intermediate tray 40 as shown in FIG. 12-1. Then said copy sheets are supplied again from the bottom to copy odd pages, so that the completed copies are stored in the sorter as shown in FIG. 12-2 at the end of the entire copying operation. Then, in case of making three copies from five originals as shown in FIG. 8-2, at first odd pages are copied and the obtained copy sheets are temporarily stored on the intermediate tray 40 as shown in FIG. 13-1. Then said copy sheets are supplied again from the bottom to copy even pages, then stored again in the intermediate tray 40 as shown in FIG. 13-2, and are guided into the sorter C without copying operation whereby the copies are finally stored in the sorter C as shown in FIG. 13-3 at the end of the entire copying operation.

Now there will be given an explanation on a control unit for executing the copying operations explained in the foregoing.

Figure 14:
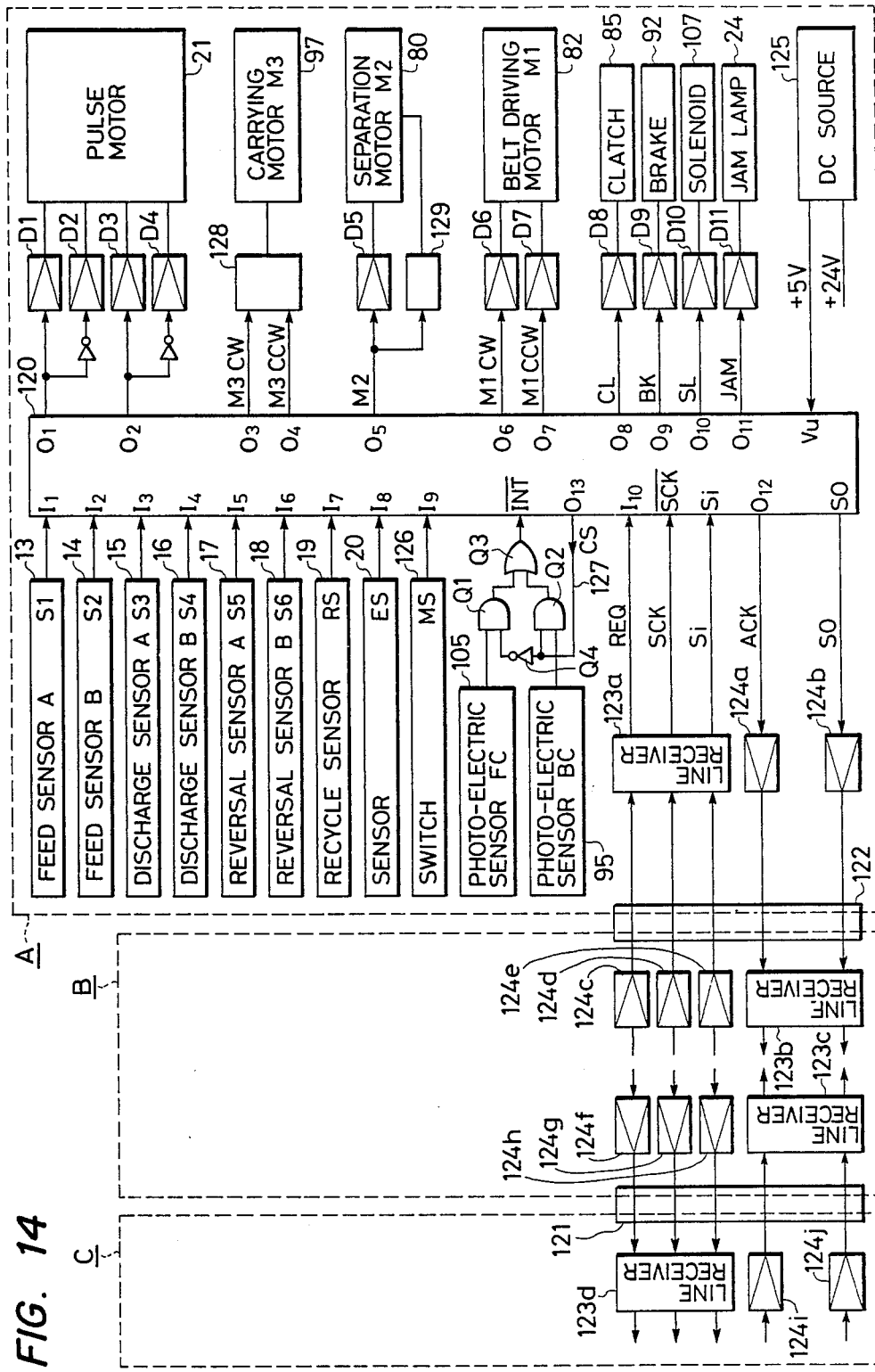
FIG. 14 is a block diagram showing a control circuit of the copier shown in FIG. 1.
Figure 15:
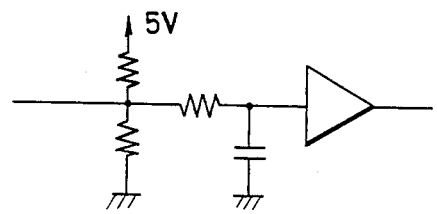
FIG. 15 is a circuit diagram of a line receiver.
Figure 16:
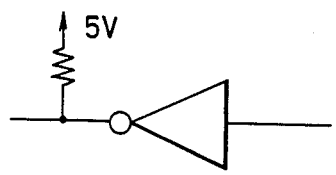
FIG. 16 is a circuit diagram of a line driver.

FIG. 14 is a block diagram of a control circuit for effecting the aforementioned operation sequence, wherein the two-side original feeding apparatus A, copier B and sorter C are respectively represented by broken lines, and the signal exchange therebetween is conducted in serial transfer process to be explained later, through a cable 122 between A and B, and a cable 121 between B and C. Line receivers 123a, 123b, 123c, 123d for receiving serial signals are composed of Schmidt TTL's of a circuit structure as shown in FIG. 15. Line drivers 124a, 124b, 124c, 124d, 124e, 124f, 124g, 124h, 124i, 124j for transmitting serial signals are composed of driver TTL's of a circuit structure as shown in FIG. 16. A one-chip microcomputer 120 of a known structure incorporating ROM, RAM etc., composed for example of μ-COM43N supplied by NEC, executes stored programs by a 5 V power supply obtained from a DC power supply of 125 V. Input ports $I_1$–$I_{10}$ of the microcomputer 120 receive signals from sensors, a signal from a microswitch MS (126) to be activated when the two-side original feeding apparatus A is opened at the front side, a request signal REQ from the copier B 40 etc. An interruption port $\overline{INT}$ receives transport clock signals from the sensor 105 (FIG. 2) or belt clock signals from the sensor 95 (FIG. 2), through a circuit composed of AND gates Q1, Q2, an OR gate Q3 and an inverter Q4. Selection of said transport clock signals or said belt clock signals is made by a switching signal CS (127) supplied from an output port O13. Output ports O1, O2, O5–O11 are connected to drivers D1–D11 for driving various loads. An output port O12 releases an acknowledge signal ACK to be supplied to the copier B. Output ports O3, O4 respectively supply signals M3CW, M3CCM to a driver 128 including an electric brake, for controlling the rotation of the transport motor M3. An electric brake circuit 129 turns off the separating motor M2 and instantly applies electric brake thereto when a signal M2 from the output port O5 is turned off.

Now there will be explained the aforementioned serial process, while making reference to FIG. 17 (1) showing a timing chart of the serial transfer. Request signals REQ are constantly supplied, at a determined interval, from the copier B. In response to the entry of said signal REQ to an input port $I_{10}$ of the microcomputer 120, the acknowledge signal ACK is released from the output port $O_{12}$ of the microcomputer 120 of the circulating apparatus A, whereupon serial data Si from the copier B and serial data So from the feeding apparatus A are transferred at a rate of 8 bits per request, in synchronization with clock signals SCK supplied from the copier B to an input port $\overline{SCK}$ of the microcomputer 120. Detailed timings will not be explained as they are same as in the serial data transfer of μ-COM43N.

Figure 17:
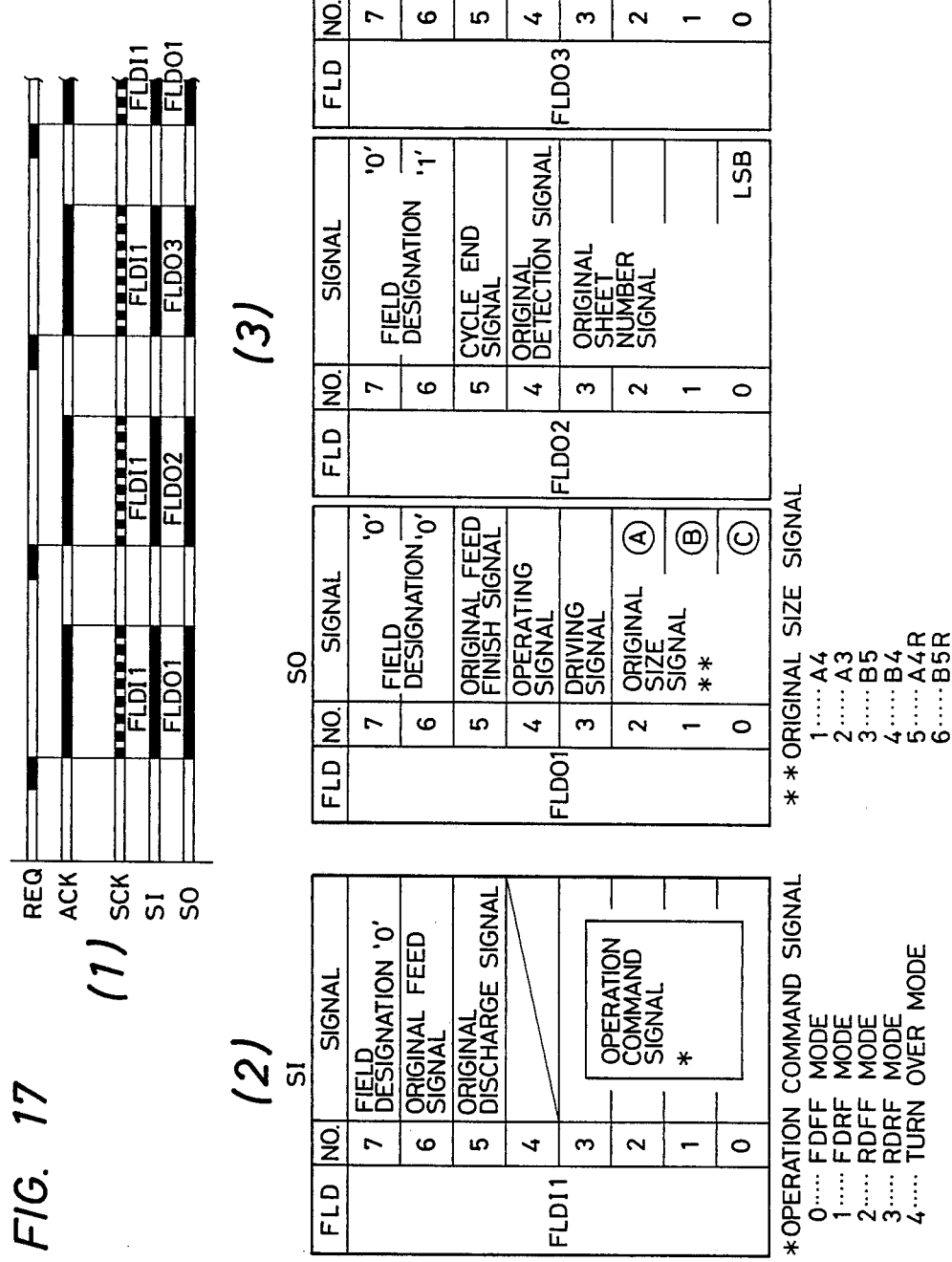
FIG. 17 is charts showing the principle of a serial transfer process.

Field signal FLDL1 shown in FIG. 17(2) is 8-bit data supplied to the feeding apparatus A, wherein a bit 7 is used for designating the field and is always "0", a bit 6 represent an original feed signal for controlling the supply and replacement of originals in the copier B, a bit 5 is an original discharge signal for conducting the original discharge alone after the final exposure or in case of sheet jamming in the copier B, and bits 3–0 are instruction signals for conducting the aforementioned operations of normal-feed-normal discharge, reversed-feed-normal discharge, normal-feed-reversed-discharge, reversed-feed-reversed-discharge and inversion. For example, in the normal-feed-reversed-discharge operation, the bits 3–0 assume values "0, 0, 1, 0". Field signals FLD01, FLD02, FLD03 shown in FIG. 17 (3) are sets of 8-bit data, of 24 bits in total, wherein bits 7 and 6 are used for designating the field. In FLD01, a bit 5 is the original feed finish signal which is turned on when the original is set on the platen glass 12 (FIG. 1), a bit 4 is an operating signal which is turned on upon reception of the original feed signal from the copier B, and a bit 3 is a driving signal which is turned on in the course of the original transport sequence of the feeding apparatus A, particularly when heavy duty loads such as motors are turned on, in order to limit the maximum power consumption of the entire system including the copier B, for example by turning off a halogen lamp in the fixing unit 39 of the copier B while said signal is turned on. Bits 2–0 are original size signals detected by the sensors 13, 14 in the course of transport of the original from the original carrier tray 1 to the platen glass 12, assuming values "0, 0, 1" for example for the A4 size, and are transmitted to the copier B substantially simultaneously with the original feed finish signal. In response to said original size signals, the copier B selects the copy sheet. In FLD02, a bit 5 is the cycle end signal which is turned on when the cycle end sensor RS (19) detects the separating arm 22 (FIG. 1) rotated by the weight thereof after the last one of the originals is fed. A bit 4 indicates the state of the original detection signal which is turned on when the original is placed on the original carrier tray 1 (FIG. 1). Bits 3–0 of FLD02 and FLD03 are original number signals indicating the number of detected originals, simultaneously with the detection of end of the cycle of the originals, wherein said number is represented by a binary number of which upper digits and lower digits are respectively represented by FLD02 and FLD03, so that for example 20 originals are represented by "0, 0, 0, 1" and "0, 1, 0, 0" of the bits 3–0 of FLD02 and FLD03. In FLD03, a bit 5 is a jam signal in case of a defective transportation of the original in the feeding apparatus A, and a bit 4 is an open-door signal which is activated when the microswitch MS 126 (FIG. 15) is actuated by the opening of the door of the feeding apparatus A. This signal is used for an original for which the feeding apparatus A is not usable, for example a bound original, and, in the presence of said signal, the copying operation of the copier B is started without the supply of the original feed signal to the feeding apparatus A when the copy button of the copier B is actuated.

Figure 18:
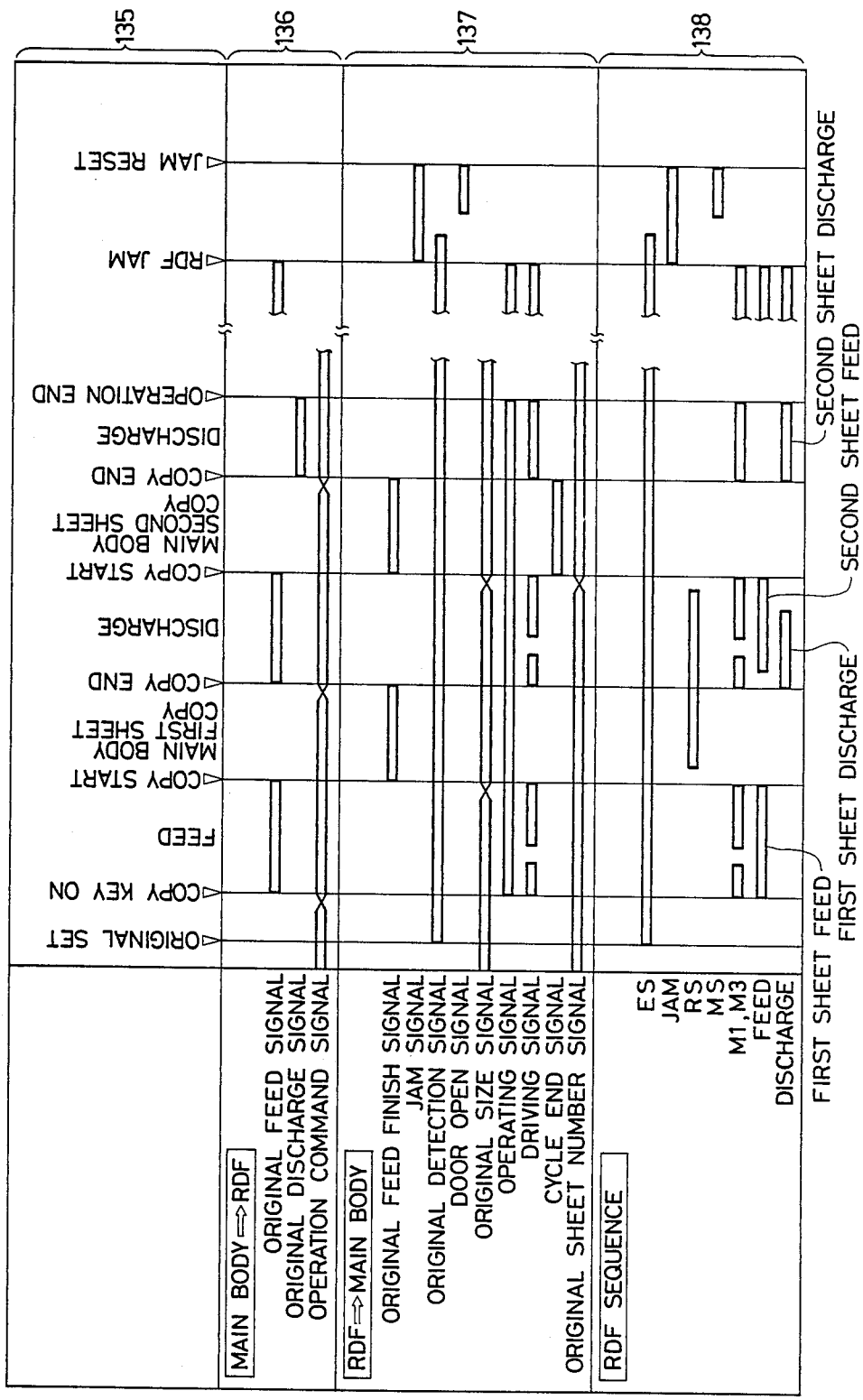
FIG. 18 is a timing chart of various signals controlling the function of the two-side original feeding apparatus and the copier.

FIG. 18 is a timing chart showing various signals of the serial data corresponding to various functions (135) of the two-side original feeding apparatus A and the copier B. 136 indicates serial signals transmitted from the copier B to the feeding apparatus A, while 137 indicates serial signals transmitted from the feeding apparatus A to the copier B, and 138 indicates the sequence in said apparatus A. The represented example shows a case of making a copy from each of two originals, in which a jamming occurs at the discharge of the second original.

Now reference is made to control flow charts shown in FIGS. 19 to 30 and timing charts shown in FIGS. 31 to 40 for explaining the function of the feeding apparatus.

Figure 19:
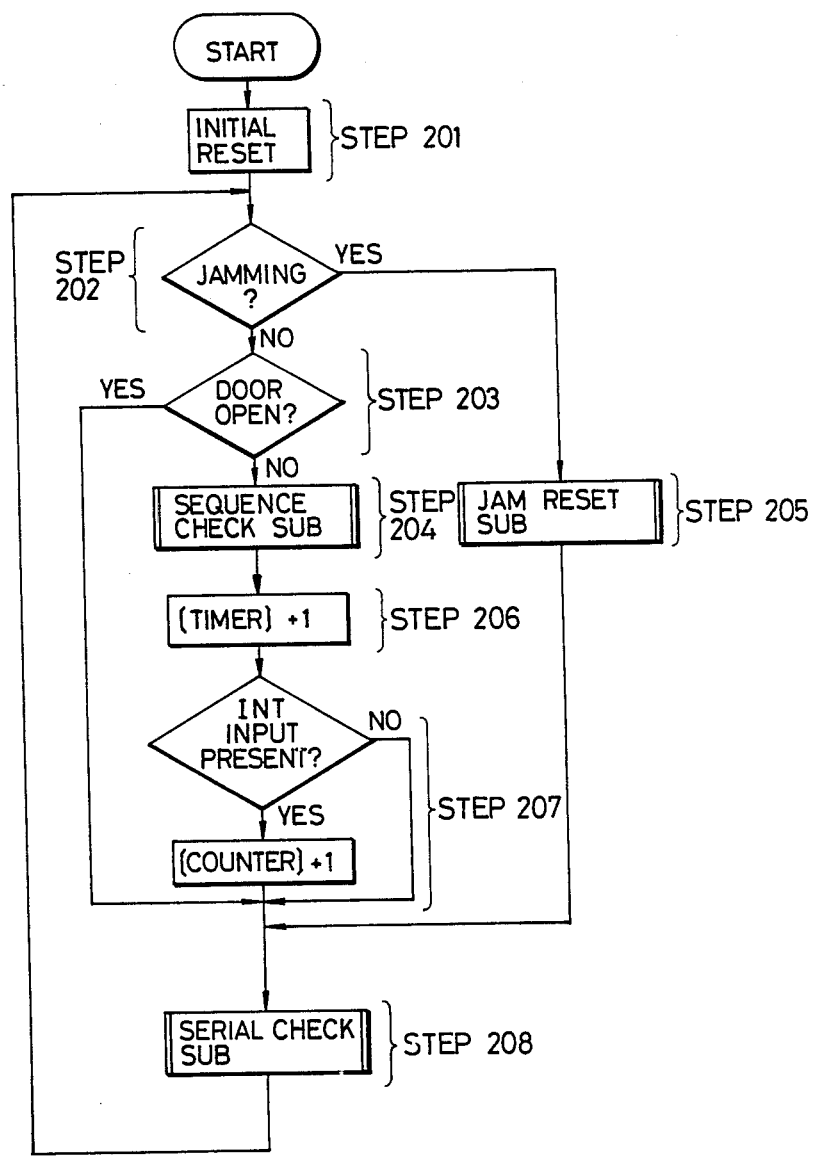
FIGS. 19 to 30 are control flow charts of the two-side original feeding apparatus.

FIG. 19 shows a main flow chart of the operation sequence of the feeding apparatus, wherein a step 201 executes an initial resetting, when the power supply is turned on, by turning off output ports, clearing the RAM area in the microcomputer 120 and also clearing counters, timers, commands etc. to be explained later. A step 202 discriminates the presence of a jam state, and, if present, the program proceeds to a JAM RESET subroutine in a step 205 to await the resetting of the jam state, or, if absent, the program proceeds to a succeeding step 203. Said step 203 discriminates whether the door of the apparatus A is open, and, if open, the program proceeds to a step 208, if closed, the program proceeds to a succeeding step 204 for entering a SEQUENCE CHECK subroutine to be explained later. A next step 206 executes stepwise increment of each of the timers activated in the step 204, and a step 207 discriminates the presence of an input signal to the port INT receiving the transport clock signals and belt clock signals, and, if present, effects the stepwise increment of each of said timers activated in the step 204. A step 208 starts a SERIAL CHECK subroutine for effecting the aforementioned serial signal transfer with the copier B. If the function is normal, the program returns, after the steps 202, 203, 204, 206, 207 and 208, to the step 202, while each of the subroutines is called by a command CAL of the microcomputer and is terminated by a command RET thereof.

Figure 20:
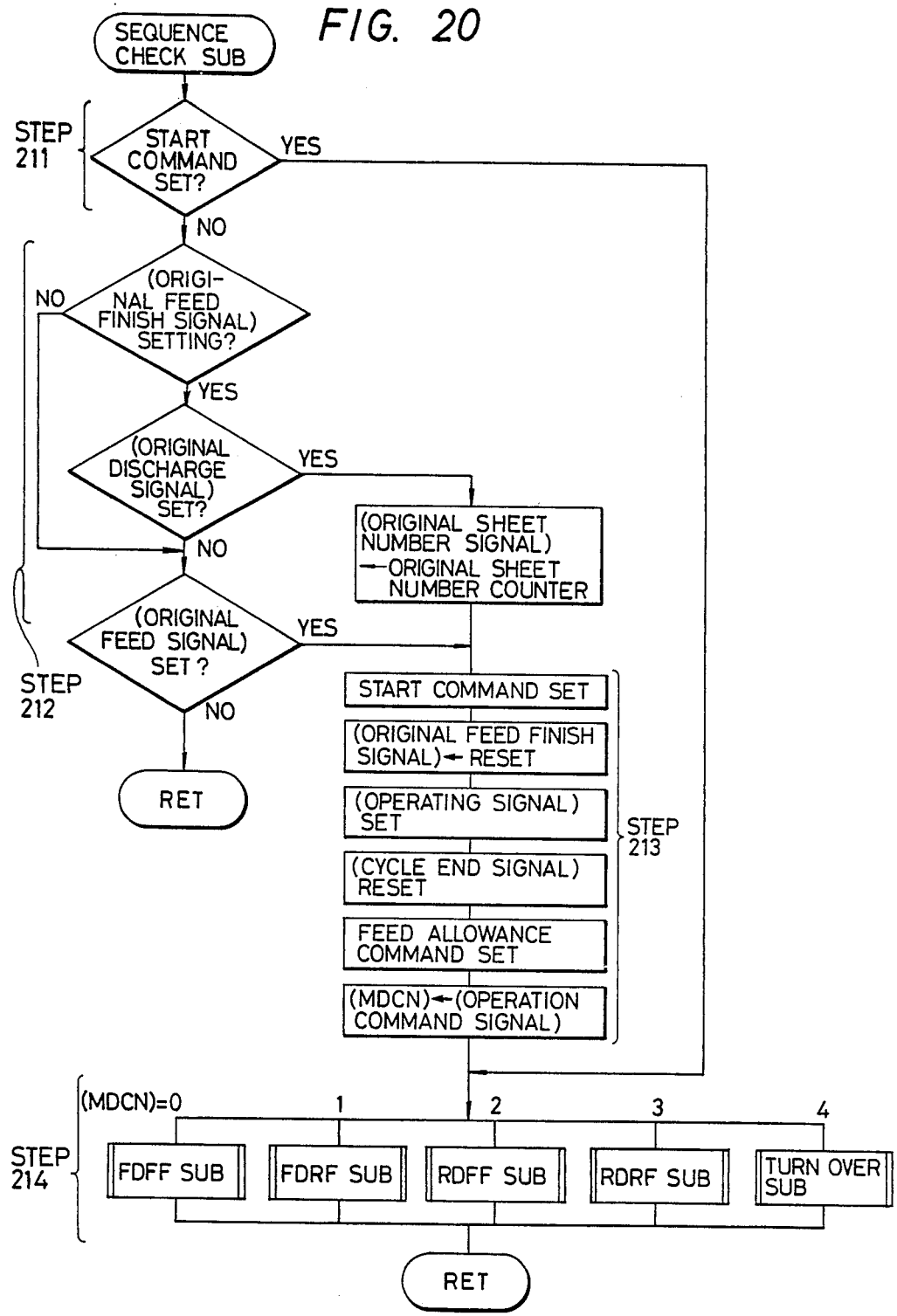

FIG. 20 shows the details of the SEQUENCE CHECK subroutine in the aforementioned step 204, in which a step 211 discriminates whether a start command, to be explained later, is set, and, if set, the sequence operation is identified in progress and the program proceeds to a step 214. If said command is not set, the program proceeds to a step 212 for awaiting an operation start command from the copier B. In said step 212, the program proceeds to a step 213 only if either of the original feed signal and the original discharge signal is set. However the original discharge signal is accepted only when the original feed finish signal is set, i.e. when an original has been fed to the platen glass 12 of the copier and a copying operation is already in progress, and, in such case, the content of an original number counter is set in the original number signal to be explained later. If neither of said signals is set, the program proceeds to a step RET whereby the SEQUENCE CHECK subroutine enters a standby state. The step 213 designates the mode of sequence operation and activates said operation. At first the start command is set in order to enable the discrimination of the operation mode only at the start of operation, thereby prohibiting the change of the operation mode from the start of operation to the end of the copying operation in the copier B, and causing the step 211 to disregard the step 213 when the operation is in progress. Also the step 213 resets the original feed finish signal at the end of the copying operation in the copier B, sets the operating signal indicating the start of the operation, and resets the cycle end signal which is released at the end of a cycle of the originals. It also sets a sheet feed enable signal to be explained later, thereby instructing the start of the sheet feeding operation, and stores an operation command signal, for designating the operation mode by the copier B in a table counter MDCN. A next step 214 is branched according to the content of said table counter MDCN. Thus the program proceeds to a normal-feed-normal-discharge subroutine for the normal-feed-normal-discharge mode in case of (MDCN)=0, to an reversed-feed-normal-discharge subroutine in case of (MDCN)=1, to normal-feed-reversed-discharge subroutine in case of (MDCN)=2, to an reversed-feed-reversed-discharge subroutine in case of (MDCN)=3, or to an reversal subroutine in case of (MDCN)=4. The operation mode is designated in the step 213 at the start of operation, then the content of the table counter MDCN is determined according to said operation mode, and the subroutine is selected in the step 214 according to the content of said table counter 214. It is therefore rendered possible to change the operation mode at the start of operation by the operation command signal of the copier, for example to supply the first original in the normal feed mode and to select the reversed-feed-reversed-discharge mode for the next operation, thus discharging the first original in the reversed discharge mode and supplying the second original in the reversed feed mode.

Figure 21A:
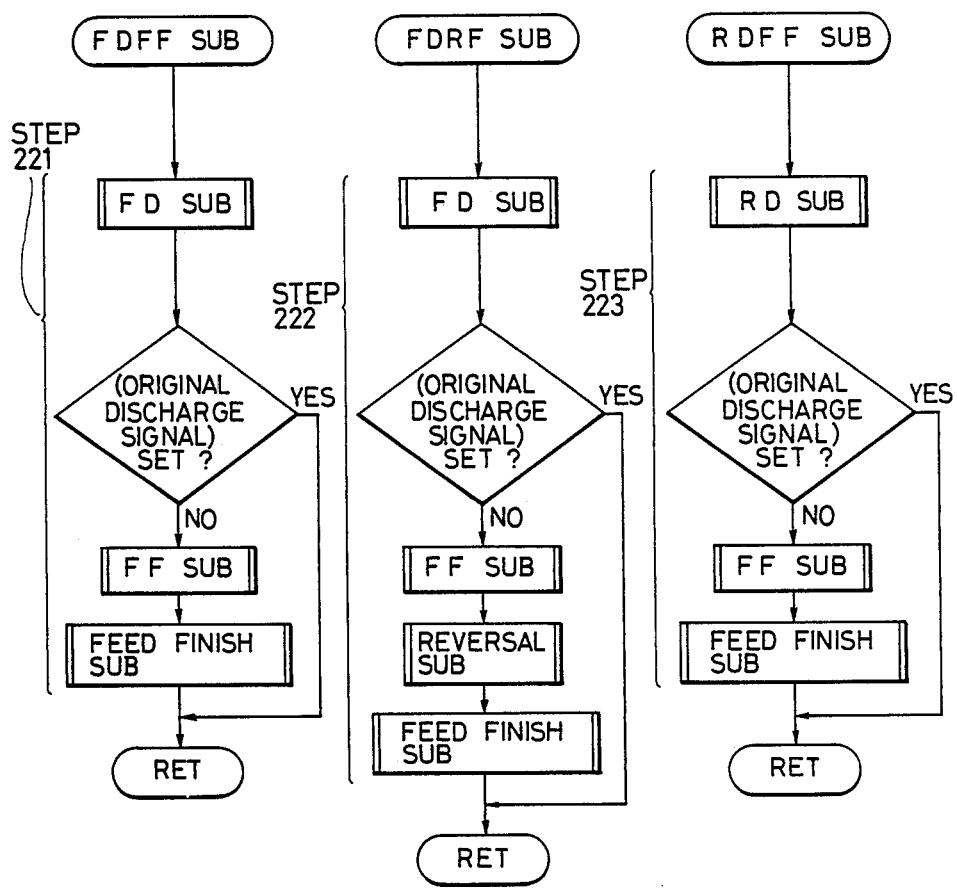
Figure 21B:
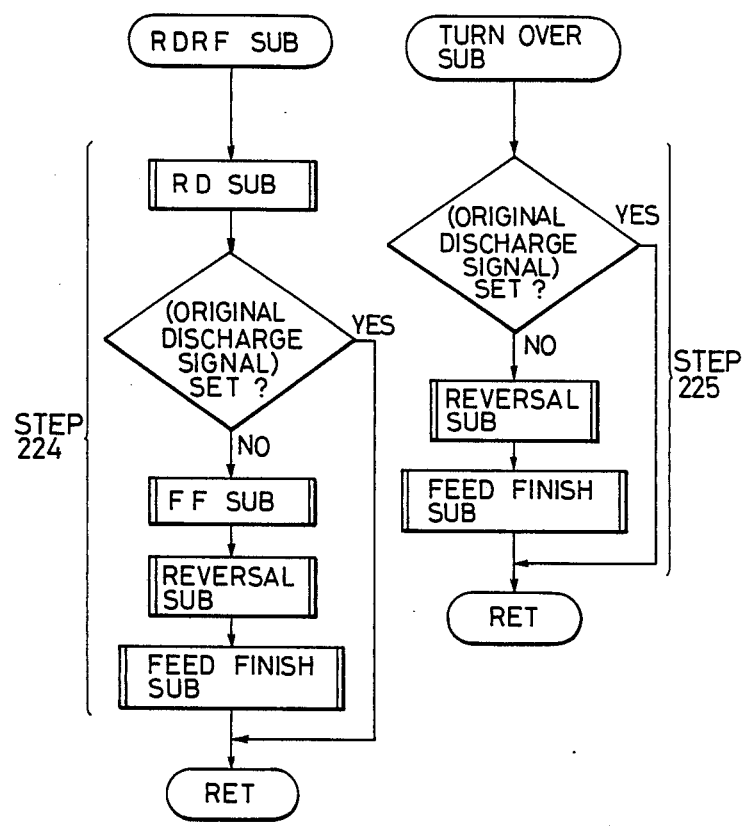

FIG. 21 shows the subroutines for feed-discharge operations according to the operation command determined in FIG. 20. A step 221, representing the normal-feed-normal-discharge subroutine, comprises a normal discharge subroutine, a normal feed subroutine and a feed finish subroutine for parallel execution of the discharge, feed and feed finish procedures. Similarly a step 222 effects the reversed-feed-normal-discharge operation, a step 223 effects the normal-feed-reversed-discharge operation, a step 224 effects the reversed-feed-reversed-discharge operation, and a step 225 effects a reversing operation. Each of said steps 221–224 identifies whether the original discharge signals is set, and, if set, effects the discharge operation only. On the other hand, in the step 225 said discharge operation is prohibited. Each of the steps 221–224 effects the discharge operation at first, but said operation is not conducted if the original is not present on the platen glass 12 of the copier.

Figure 22A:
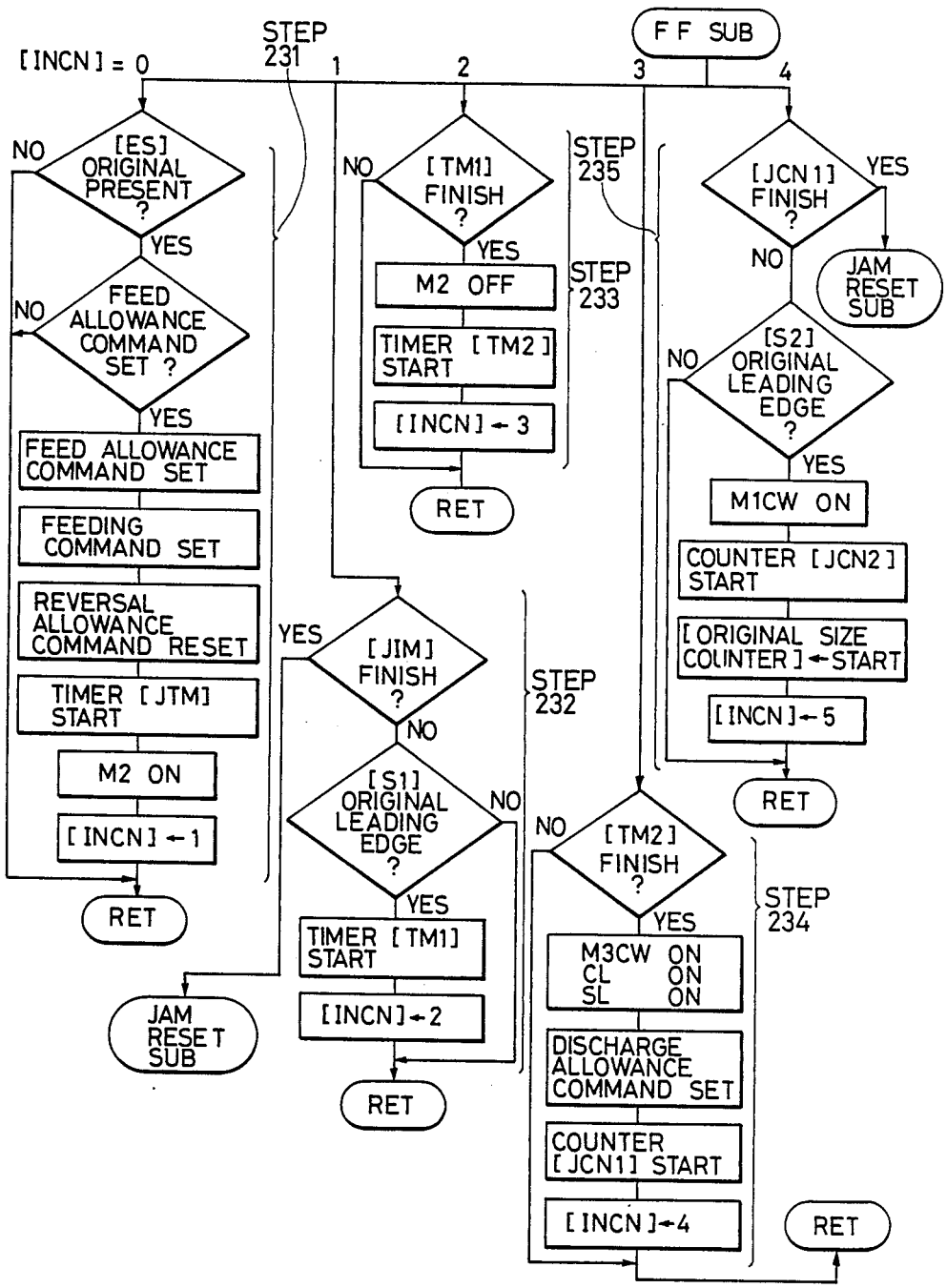
Figure 22B:
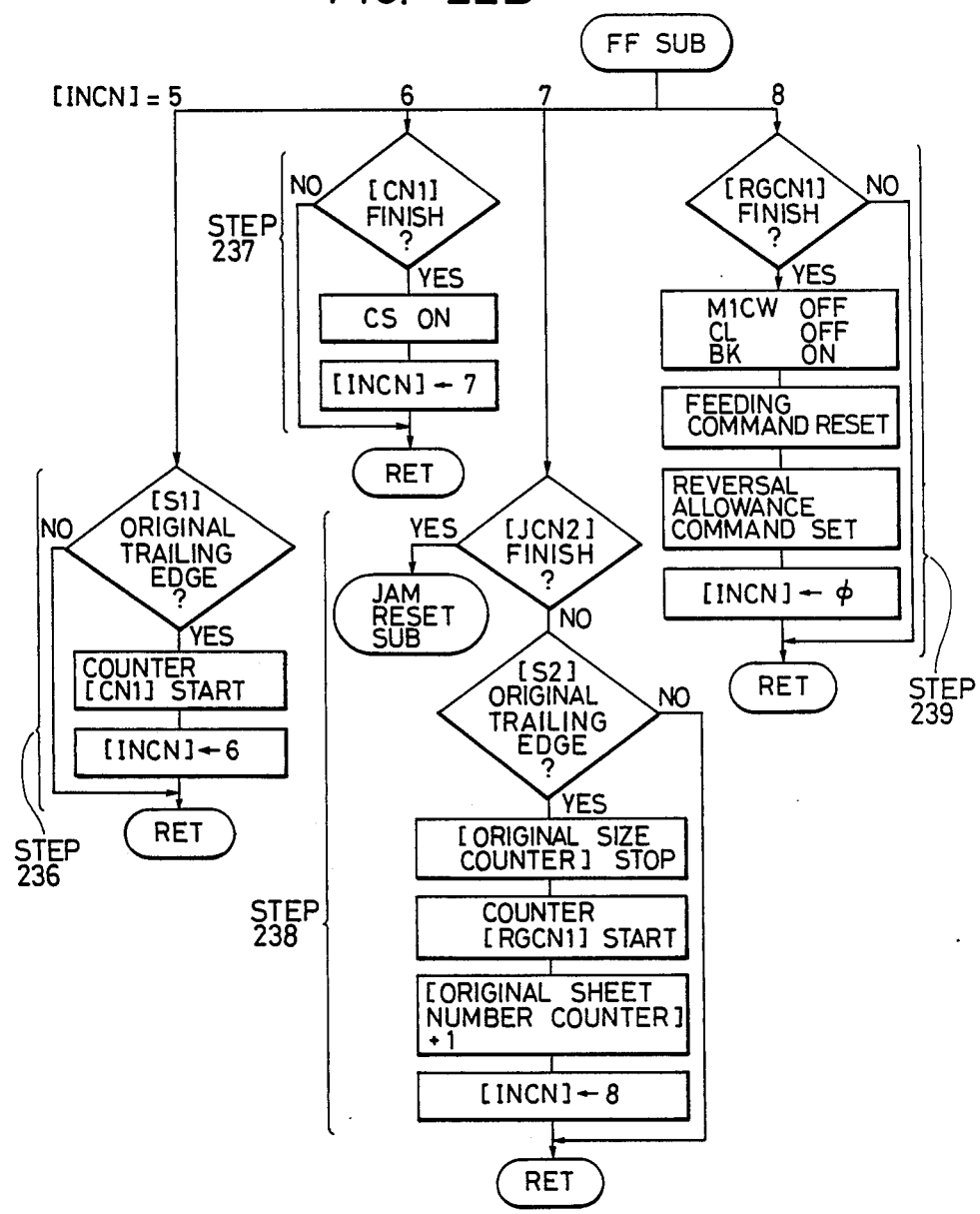
Figure 25A:
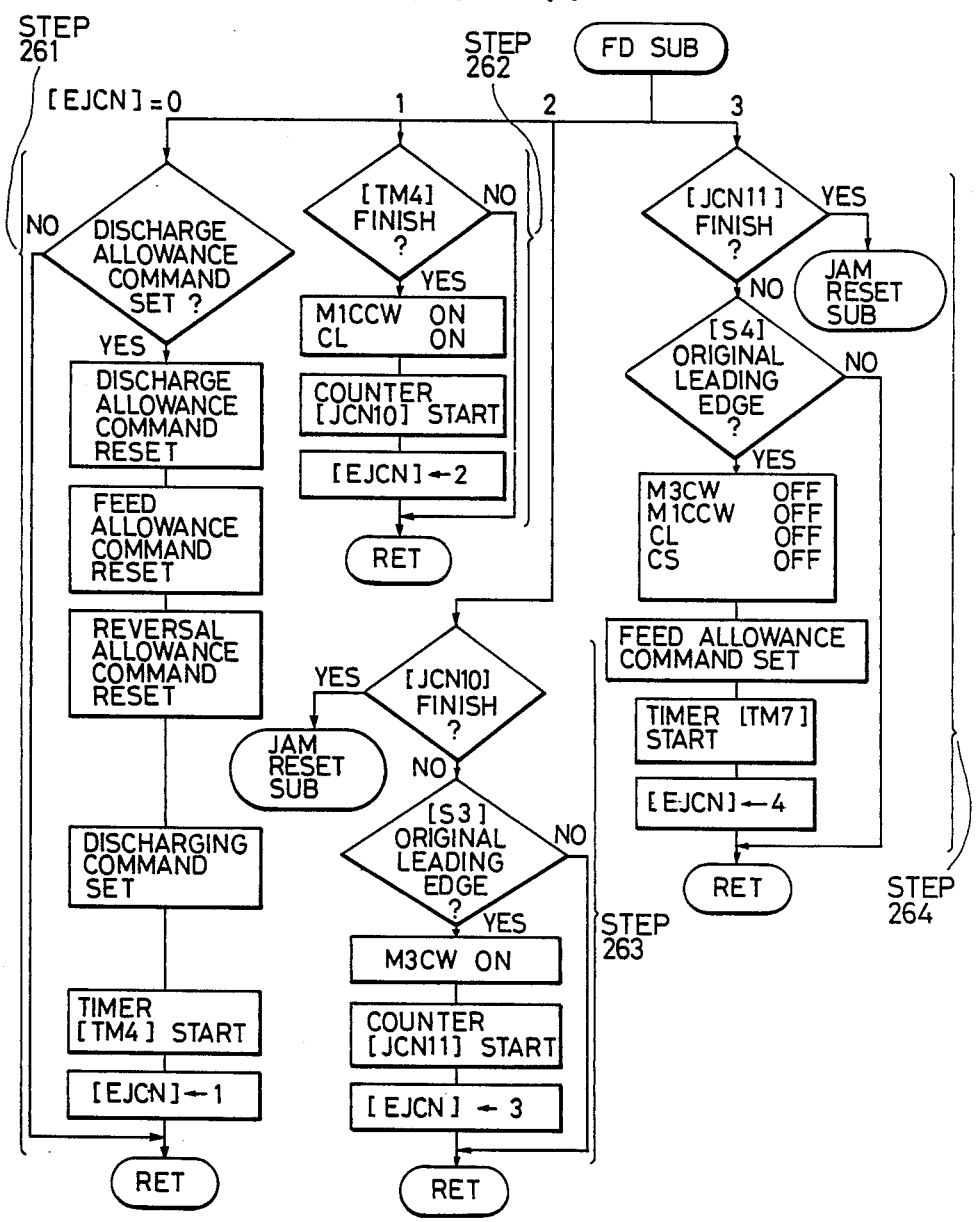
Figure 25B:
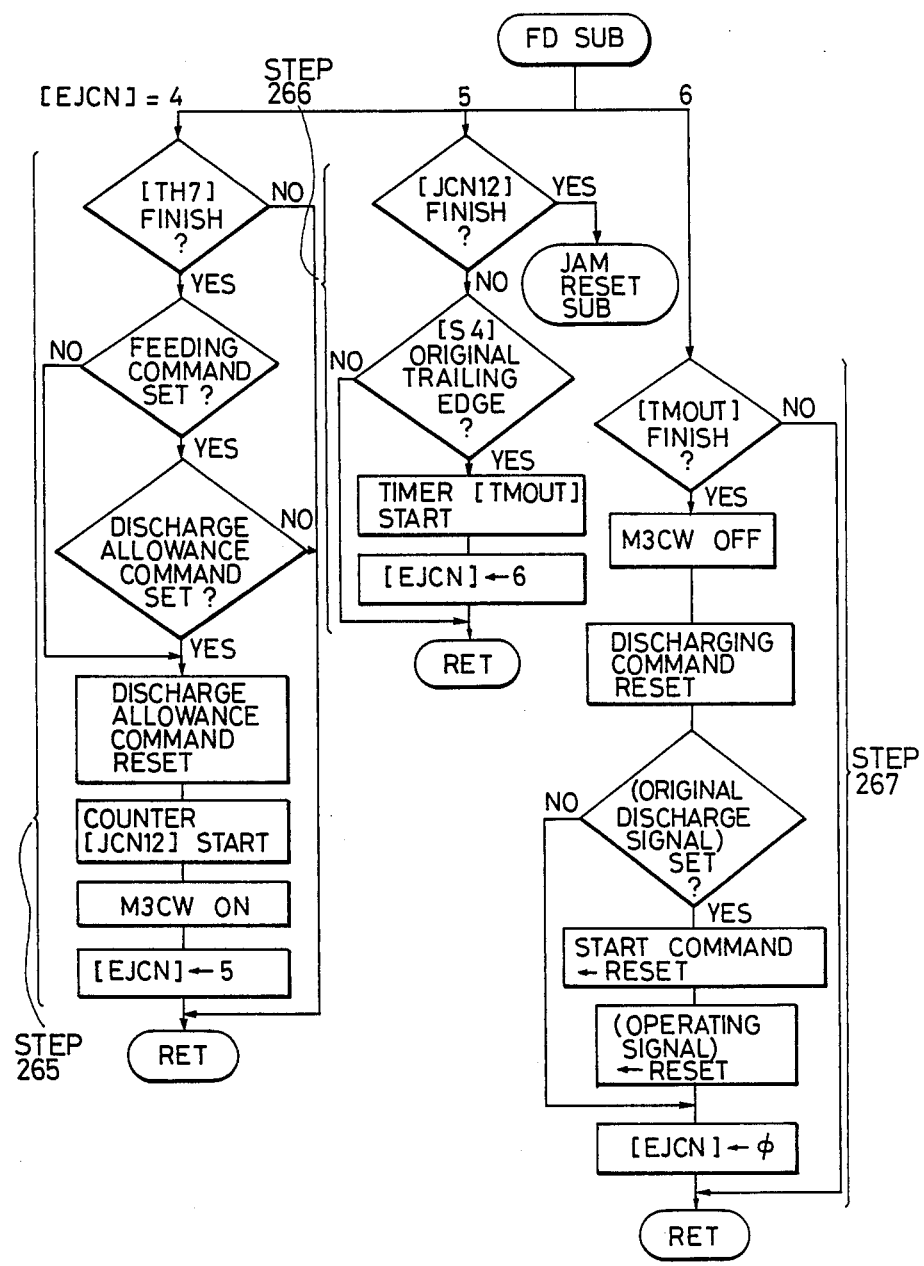

Now there will be given a detailed explanation on the normal-feed-normal-discharge operation, making reference to flow charts of a normal-feed subroutine, a normal-discharge subroutine and a feed completion subroutine respectively shown in FIGS. 22, 25 and 27 and taking a case of employing two originals for example.

The normal-feed-normal discharge operation is commenced by placing two originals on the original carrier tray 1, selecting said mode by the copier B and setting the original feed signal. In the normal-feed subroutine shown in FIG. 22, a step 231 identifies the detection of the original by the sensor ES (20) in FIG. 1-1, resets the feed enable signal which has been set in the aforementioned step 213, resets the reversal enable command, sets the feeding signal to prohibit other operations, starts a jam timer JTM for measuring the time to the sensor S1 (13) in FIG. 1-1, turns on the separating motor M2 (80) in FIG. 1-1, and sets "1" in a table counter iNCN for initiating the separation of the original. The program is branched according to the content of said table counter iNCN, wherein said content is renewed with the progress of the operation sequence. Other table counters to be explained later perform similar functions. A step 232 discriminates whether the leading end of the separated original is detected by the sensor S1 before the expiration of said jam timer JTM, and, if said timer expires before said detection, a defective separation is identified and the program proceeds to the JAM RESET subroutine. If the function is normal, a timer TM1 is started for guiding the leading end of the original proceeding in the path Ia to the rollers 6, 6a and forming a loop in said original, and the table counter iNCN is stepped up to "2". A step 233 turns off the motor M2 upon expiration of said timer TM1 to form said loop, starts a loop stabilizing timer TM2 and steps up the table counter iNCN to "3". A step 234 turns on signals M3CW, M1CW, CL, SL released from the output ports 03, 06, 08, 010 of the microcomputer 120 upon expiration of said loop stabilizing timer TM2 thereby initiating the transportation of the original, sets the discharge enable signal to be explained later, starts a jam counter JCN1 for measuring the time to the sensor S2 (14) shown in FIG. 1-1, and steps up the table counter iNCN to "4". A step 235 identifies whether the leading end of the original is detected by the sensor S2 before the expiration of the jam counter JCN1, and, if said counter expires without said detection, a delay jamming is identified and the program enters the JAM RESET subroutine. If the operation is normal, a jam counter JCN2 is started upon said detection, in order to detect a stay jamming by measuring the time required by the original to pass through the sensor S2, then an original size counter is started to initiate the original size detection, and the table counter iNCN is stepped up to "5". A step 236 discriminates whether the sensor S1 detects the trailing end of the original, and, upon detection, starts a counter CN1 for counting the clock signals of a number corresponding to the distance from the sensor 1 to the rollers 6, 6a, and steps up the table counter iNCN to "6". A step 237 turns on a signal CS released from the output port 013 upon expiration of said counter CN1, and steps up the table counter iNCN to "7". While the original is supported by the rollers 6, 6a and the belt 8, the transport speed of the original is equal to that of the rollers 6, 6a so that the counters depend on the clock pulses released from the disk 104 and the photosensor 105. However, as soon as the trailing end of the original leaves the rollers 6, 6a, the transport speed of the original becomes equal to that of the belt 8, whereby the control depends on the belt clock signals released from the disk 94 and the photosensor 95. Consequently, upon expiration of said counter CN1 when the trailing end of the original leaves the rollers 6, 6a, a signal CS for controlling the input signal to the interruption port INT is turned on to replace the transport clock signals with the belt clock signals, thereby achieving continuity in the control without any change in the relationship between the clock signals and the distance of transportation. A step 238 discriminates whether the trailing end of the original is detected by the sensor S2 before the expiration of the jam counter JCN2, and, if said counter expires before said detection, a stay jamming is identified and the program proceeds to the JAM RESET subroutine. On the other hand, if the operation is in the normal state, the original size counter is turned off at the detection of the trailing end to terminate the original size detection, then a registration counter RGCN1 is started for measuring the time required for the original to move to the determined position IIa on the platen glass 12 of the copier B, the original number counter is stepped up to count the number of originals, and the table counter iNCN is stepped up to "8". A step 239 turns off the signals M3CW, M1CW, CL and turns on a signal BK upon expiration of said registration counter RGCN1 in order to precisely stop the original at said position IIa on the platen glass 12, also resets the feeding command, sets the reversal enable command to be explained later, and resets the table counter iNCN to "0". Thereafter the program returns to the step 231 and enters a standby state since the feed enable command has been reset in this state.

Figure 27A:
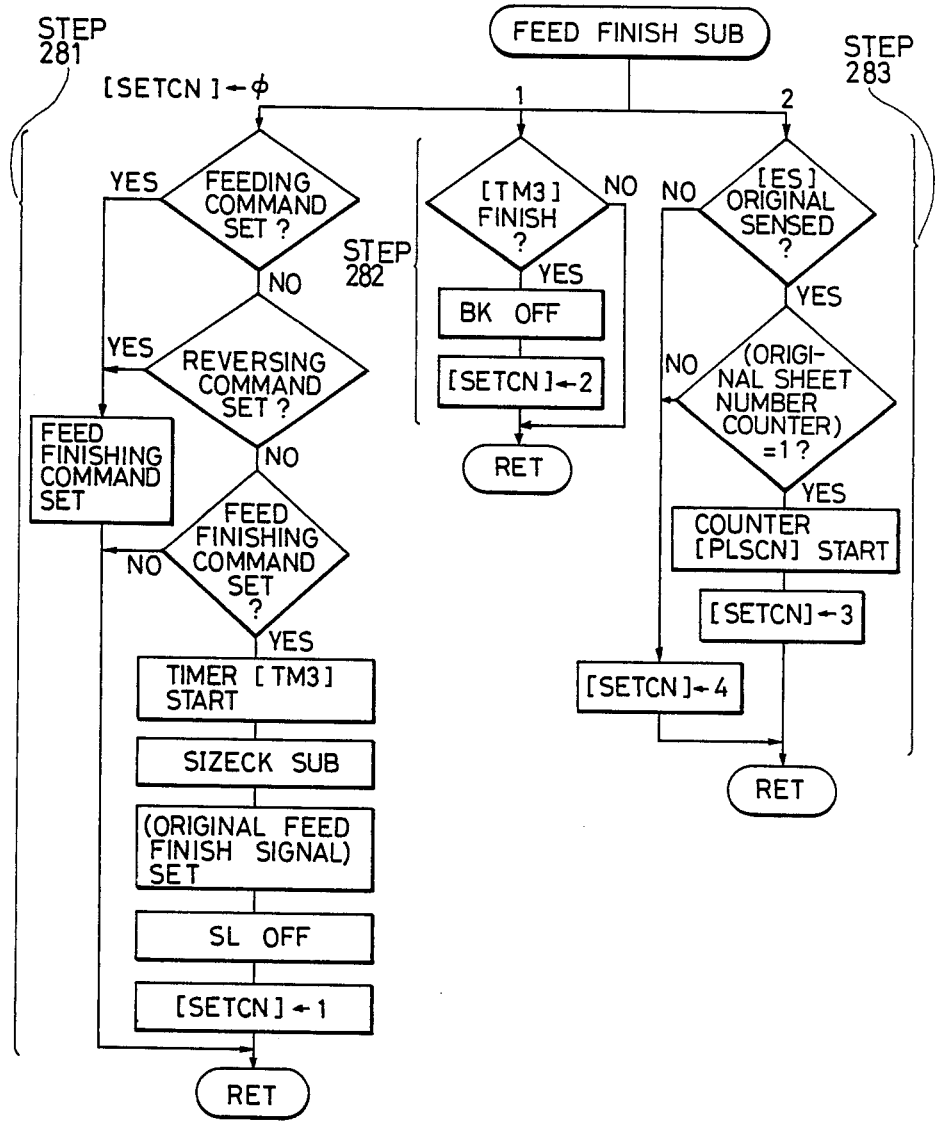
Figure 27B:
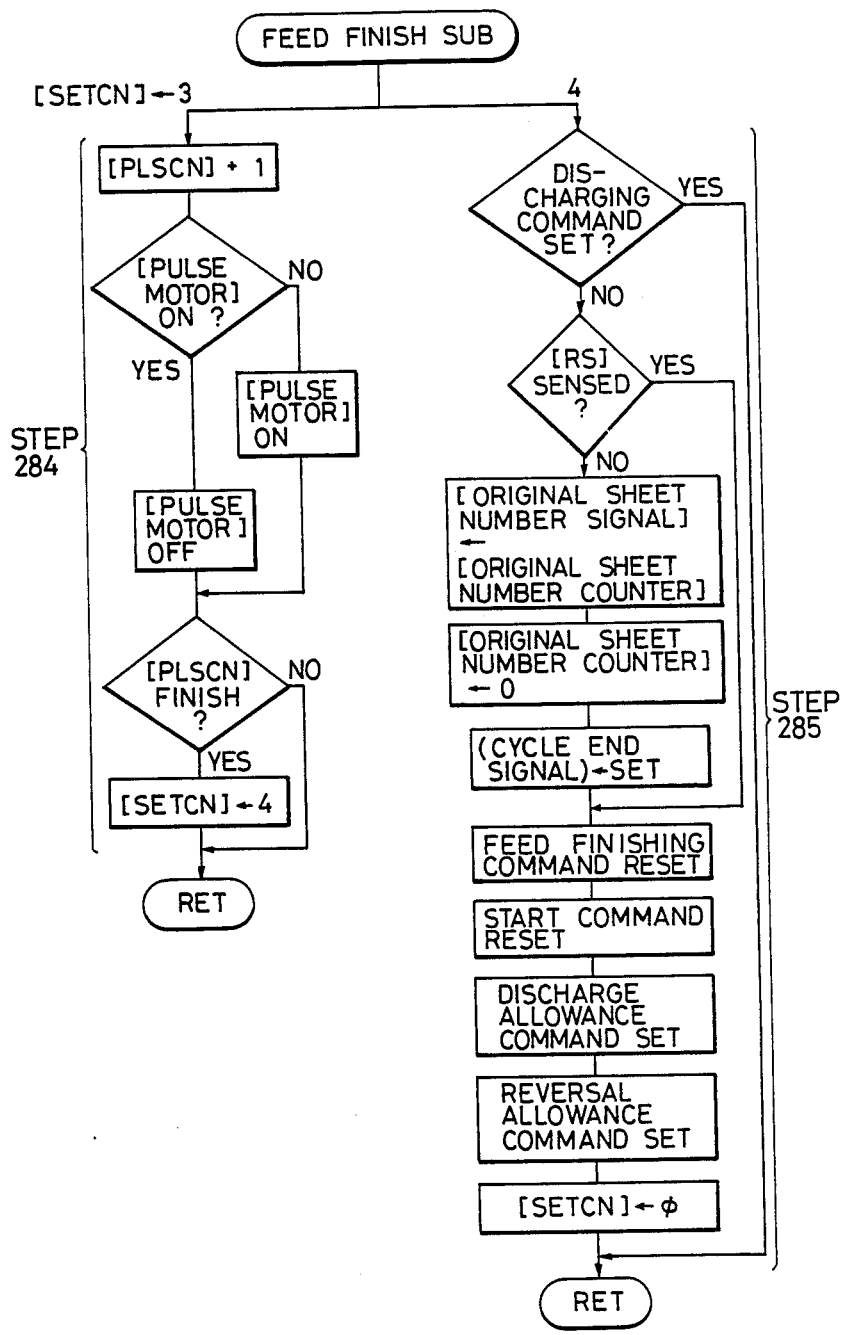

Now reference is made to FIG. 27 showing the feed finish subroutine. At first a step 281 is executed in a state that a table counter SETCN=0. During the aforementioned normal-feed operation, the feeding command has been set so that the standby state is established by setting the feed finishing command. Said standby state is resolved by the resetting of the feeding command in the aforementioned step 239, as the reversing command to be explained later is also reset. Thus, as the feed finishing command is also set, a timer TM3 for measuring the energizing time of the brake BK (92) is started, and a SIZECK subroutine is executed for identifying the original size from the content of the original size counter and storing the original size data in the original size signal in the serial data. Subsequently the original feed finishing signal is stored in the serial data and a copy start command is released to the copier. In response the copier turns off the original feed signal and initiates the first copying operation. Then the solenoid SL is deactivated to switch the path for the original, and the table counter SETCN is stepped up to "1". A step 282 turns off the brake BK upon expiration of said timer TM3, and steps up the table counter SETCN to "2". Steps 283, 284 controls the separating arm 22 for detecting a cycle of the stacked originals and the stepping motor 21. The step 283 discriminates the output signal from the sensor ES indicating the presence or absence of a next original on the original carrier tray 1. In case the next original is absent, the stepping motor 21 need not be operated since there is only one original. Thus the table counter SETCN is stepped up to "4" and the program proceeds to a step 285. On the other hand, if the next original is present, there is identified whether the content of the original number counter is equal to "1". If not "1", there should exist two or more originals so that the control with the stepping motor 21 should have been conducted, and the program proceeds likewise to the step 285. In the present example in which the content of said counter is equal to "1", indicating the first original, there is started a counter PLSCN for causing one turn of the stepping motor 21, and the table counter SETCN is stepped up to "3". The succeeding step 284 steps up the counter PLSCN for each routine process to turn on or off the stepping motor 21 respectively when it is off or on, thus advancing the stepping motor 21 by a step angle and causing a full turn thereof at the expiration of the counter PLSCN, and thereafter steps up the table counter SETCN to "4". The step 285 checks the discharging command to await the completion of the discharging operation in progress, and proceeds to a next step when said command is reset, indicating the completion of the discharging operation. Since the first original is handled in the present case, there is identified whether the recycle sensor RS (19)

still continues the detection. As said sensor still detects the separating arm 22 placed on the remaining originals, there is identified that the first cycle of the originals is still in continuation. However, in the absence of said detection, indicating the completion of a cycle of the originals, the content of the original number counter is stored as the number of the originals of a set in the original number signal of the serial data, then said content is cleared, and the cycle end signal is simultaneously set to transmit the completion of a cycle to the copier. Furthermore the step 285 resets the feed finishing command and the aforementioned start command, sets the feed enable command and the reversal enable command and resets the table counter SETCN to "0", whereupon the program enters the standby state.

At this point the program proceeds to the step 212 shown in FIG. 20 by resetting the start command, and, if a copying operation is in progress in the copier, the program returns to RET and enters the standby state as the original discharge signal and the original feed signal are both reset in this state.

Now there will be explained the normal-feed-normal-discharge operation after the end of a copying operation. Referring to FIG. 20, if the original feed signal is set at the end of the copying operation, the program proceeds to steps 213, 214 to reset the original feed finish signal and call the normal-feed-normal-discharge subroutine. In the normal-feed-normal-discharge subroutine shown in FIG. 21, there are executed a normal-discharge subroutine shown in FIG. 25 and a normal-feed subroutine shown in FIG. 22 in parallel, in order to effect the normal feed of the second original simultaneously with the normal discharge of the first original. Now reference is made to FIG. 25 for explaining the normal discharge operation for the first original. As a table counter EJCN is "0" in this state, the program proceeds to a step 261 for inspecting whether the discharge enable command is set. As said command is set in the step 234 of the normal-feed subroutine in this case, the program proceeds further to reset the discharge enable command, feed enable command and inversion enable command thereby prohibiting other operations, to set the discharging command, to start an interval timer TM4 and to step up the table counter EJCN to "1". A next step 262 turns on the signals M1CCW. CL upon expiration of said interval timer TM4 thereby initiating the original discharging operation, starts a jam counter JCN10 for measuring the time to the discharge sensor S3 (15), and steps up the table counter EJCN to "2". A next step 263 discriminates whether the discharge sensor S3 detects the leading end of the original proceeding in the path VIIa before the expiration of the jam counter JCN10, and, if said counter expires without said detection, a delay jamming is identified and the program proceeds to the JAM RESET subroutine. On the other hand, if the operation is normal, a jam counter JCN11 for measuring the time to the discharge sensor S4 (16) is started and the table counter EJCN is stepped up to "3". A next step 264 discriminates whether the discharge sensor detects the leading end of the original before the expiration of the jam counter JCN11, and, if said counter expires without said detection, a delay jamming is identified and the program proceeds to the JAM RESET subroutine. On the other hand, if the operation is normal, the signals M3CW, M1CCW, CL and CS are turned off suspend the transportation, thereby stopping the original at a position bridging the rollers 6, 6a and the belt 8. Simultaneously the feed enable command is set to initiate the normal-feed operation for the second original, then the standby state in the step 231 of the normal-feed subroutine shown in FIG. 22 is resolved, and the feeding command is set to initiate the separation of the second original in the aforementioned manner. Furthermore an interval timer TM7 is started, and the table counter EJCN is stepped up to "4". In a next step 265, the program enters a standby stae until the feeding command and the discharge enable command are set upon expiration of the interval timer TM7. Said discharge enable command is set, in the course of the normal-feed operation for the second original in FIG. 22, at the step 234 when the transport of the second original is started. Thus the procedure in the step 265 proceeds further to reset the discharge enable command, to start a jam counter JCN12 for measuring the time until the original passes through the sensor S4, to turn on the signal M3CW thereby initiating the discharge operation and to step up the table counter EJCN to "5". A next step 266 discriminates whether the sensor S4 detects the trailing end of the original before the expiration of the counter JCN12, and, if said counter expires without said detection, a stay jamming is identified and the program enters the JAM RESET subroutine. On the other hand, if the operation is normal, after the discharge operation through the path VIa, a post-rotation timer TMOUT is started, and the table counter EJCN is stepped up to "6". A step 267 turns off the signal M3CW and resets the discharging command upon expiration of said post-rotation timer TMOUT, thus terminating the discharge operation. In addition, if the original discharge signal is set, indicating that said discharge operation is instructed by the copier, the start command shown in FIG. 20 is reset and the serial data are reset to terminate all the operations, and the table counter RJCN is reset to zero. Then the program returns to the step 261 and enters a standby state. In case the second original is being fed, the feed finishing subroutine shown in FIG. 27 is in progress simultaneously with the discharge operation for the first original, so that the original feed finish signal is set and the copier is copying the second original. As a cycle of the originals in this case is completed by the feeding of the second original, the detection of the sensor RS is terminated in a step 285, whereby the cycle end signal is supplied to the copier to turn off the start command. Thus the program enters a standby state in the step 212 in FIG. 20.

Now there will be explained the normal discharge operation for the second original. Since the cycle end signal is released in this case, the original discharge signal is set after the completion of the second copying operation, in order that the copier effects the discharge operation alone. Therefore, in the normal-feed-normal-discharge subroutine shown in FIG. 21, the step 221 executes the normal-discharge subroutine but does not execute the normal-feed subroutine. The normal discharge operation is conducted according to the steps 261 to 267 as shown in FIG. 25, and, as the original discharge signal is set as explained before, a step 267 terminates the operation, and resets the start command and operating signal. In response the copier turns off the original discharge signal, thus completing the copying operation for a cycle of the originals.

Now there will be explained the reversed-feed-normal-discharge operation. The operation is conducted by the reversed-feed-normal-discharge subroutine of the step 222 shown in FIG. 21, wherein the original present on the platen glass 12 of the copier is discharged through the path VIIa according to the normal discharge subroutine shown in FIG. 25. Said operation is suspended at a step 264 when the leading end of the original reaches the sensor S4 and the reversed feed of the succeeding original is initiated, through the path Ia according to the normal feed subroutine shown in FIG. 22. After the original separation, the normal discharge operation is started again at the step 234 when the transportation by the rollers 6, 6a is started, whereby the discharged original proceeds through paths VIIa and VIa. On the other hand, upon completion of the normal feed operation, the original is positioned at IIa on the platen glass and is stopped in this position. The program proceeds to the inversion subroutine shown in FIGS. 23 and 24, and awaits the completion of the normal discharge operation in a step 243. Upon said completion the reversal subroutine is started, whereby the original proceeds through paths IIIa-IVa-Va-VIa-VIIa-IIa to stop on the determined position in the platen glass 12, and the copy start command is released in the feed finishing subroutine shown in FIG. 27.

The normal-feed-reversed-discharge operation is conducted by the normal-feed-reversed-discharge subroutine of a step 223 shown in FIG. 21. The original positioned at IIa on the platen glass 12 is discharged through the path IIIa according to the reversed discharge subroutine shown in FIG. 26 and proceeds through the path IVa, and said operation is temporarily suspended when the sensor S5 (17) detects the rear end of the original in a step 274. At this point the normal feed operation for the next original is started through the path Ia according to the normal-feed subroutine shown in FIG. 22. The reversed-discharge operation is started again when the transportation by the rollers 6, 6a is started in the step 234, and the discharged original is discharged through the paths Va-VIa. On the other hand the fed original passes through the paths Ia and IIa and stops at a determined position on the platen glass 12, when the copy start command is released in the feed finishing subroutine shown in FIG. 27.

Figure 23A:
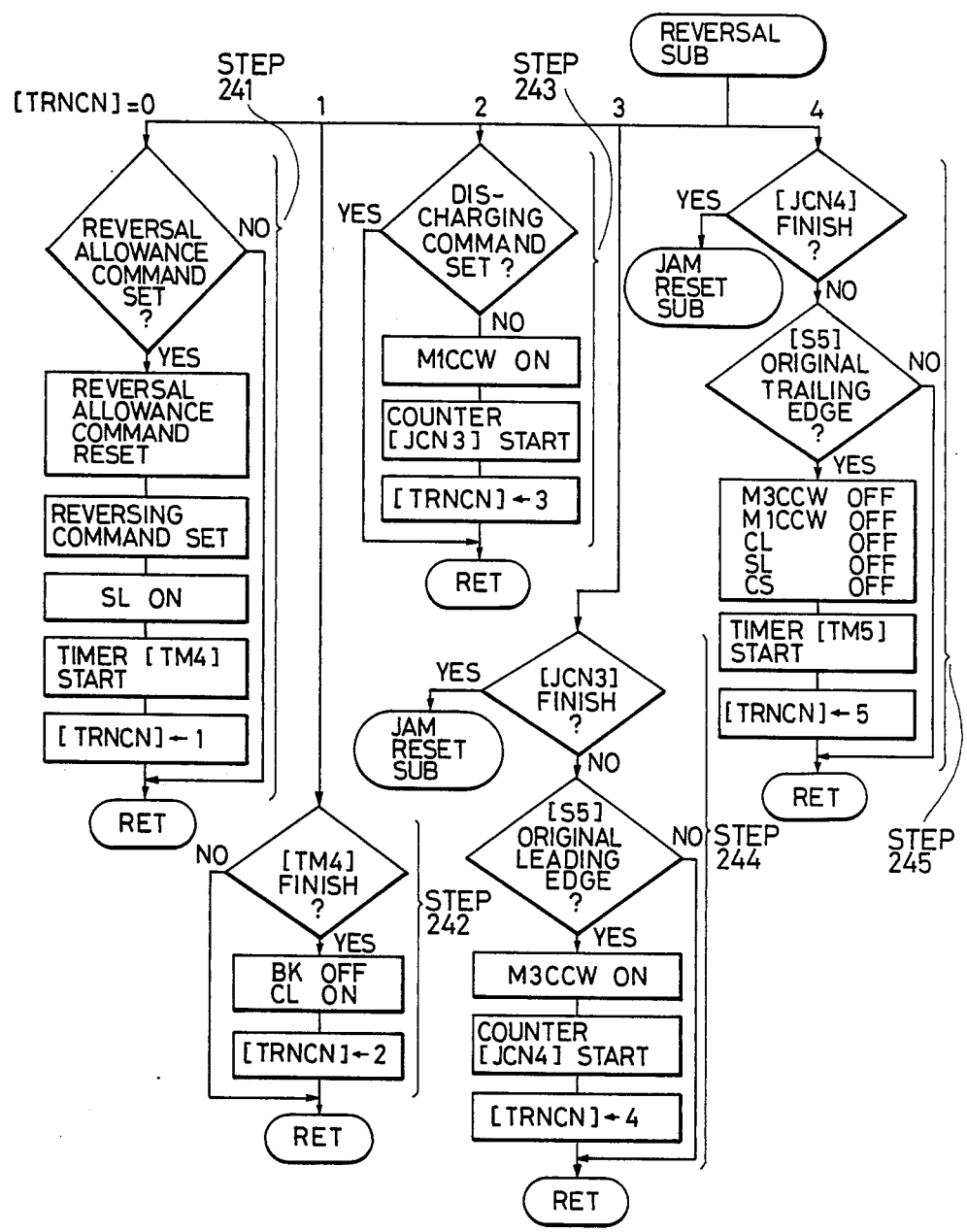
Figure 23B:
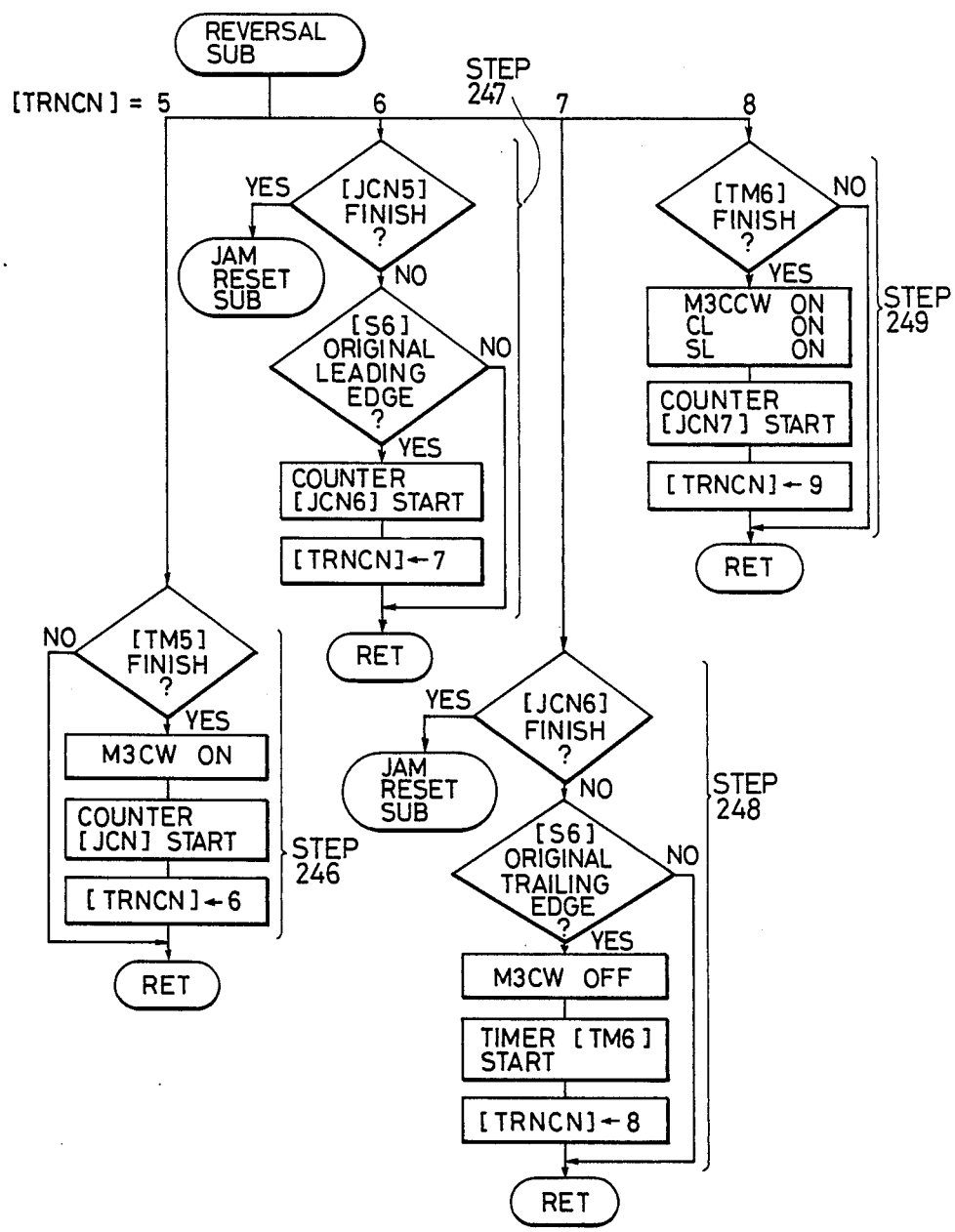
Figure 24:
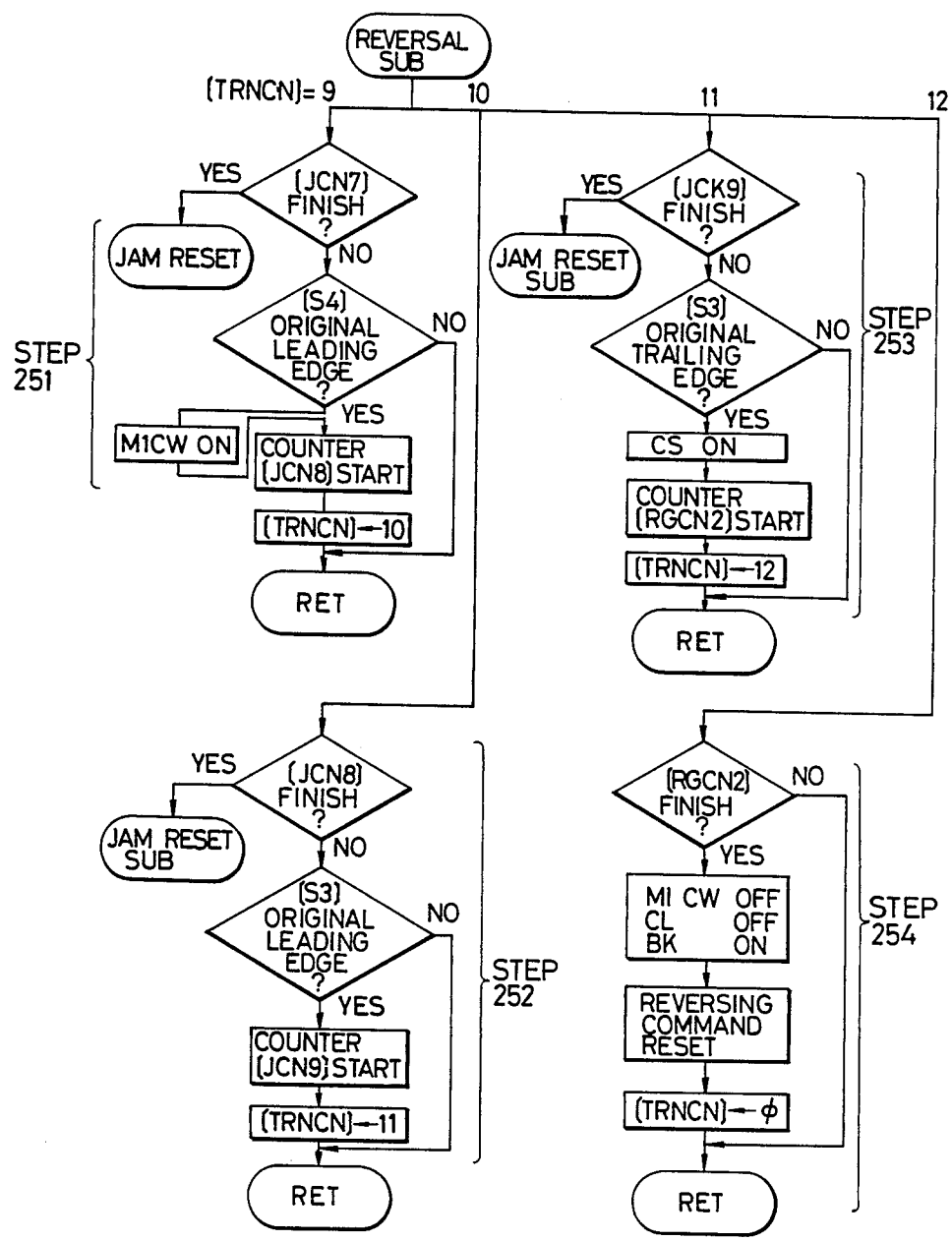

The reversal operation is conducted by the reversal subroutine of a step 225 shown in FIG. 21, wherein the original positioned at IIa on the platen glass 12 proceeds along the paths IIIa, IVa, Ia, VIa, VIIa and IIa according to the reversal subroutine shown in FIGS. 23 and 24. When said original stops at the determined position on the platen glass 12, the copy start command is released in the feed finishing subroutine shown in FIG. 27.

Figure 26A:
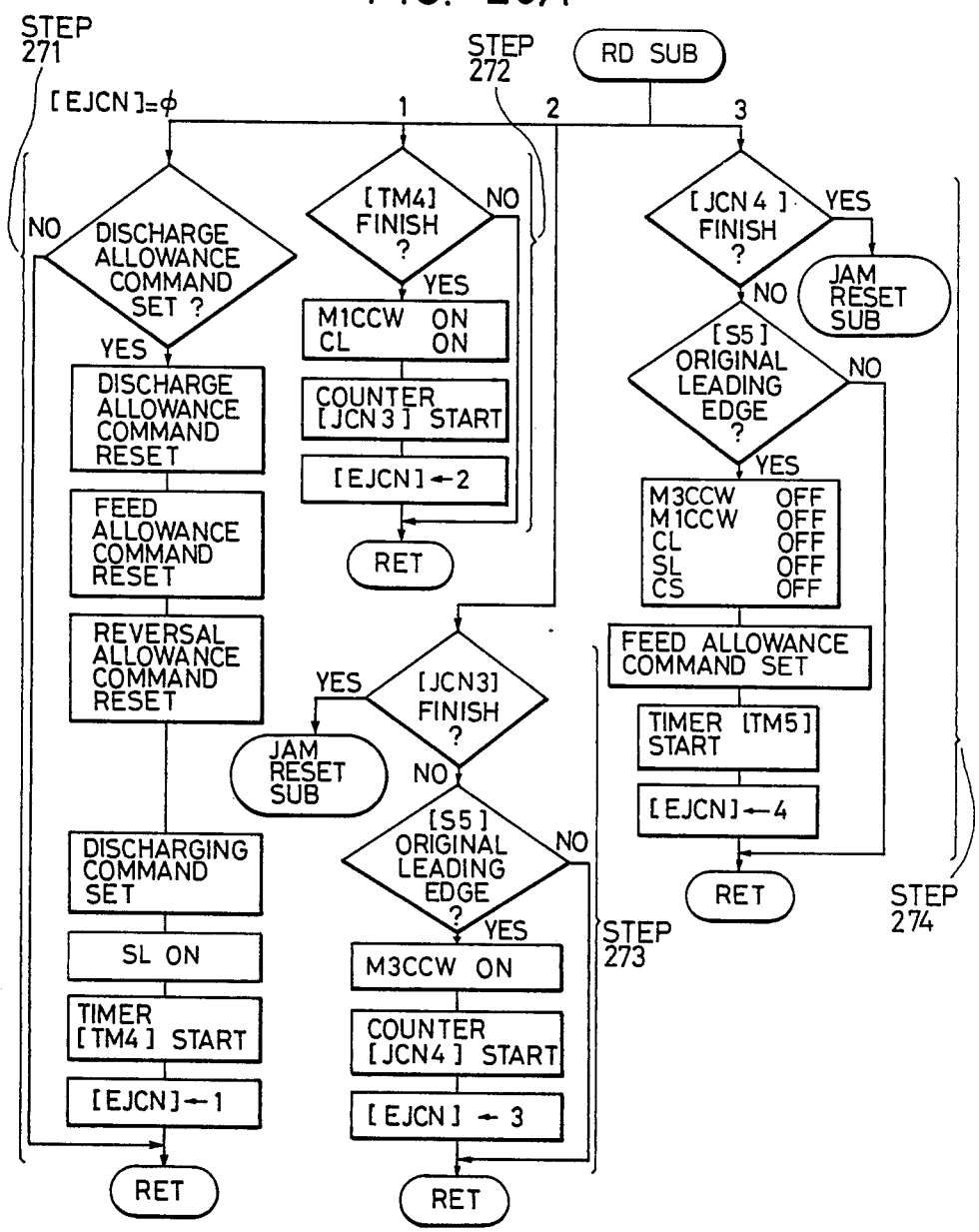
Figure 26B:
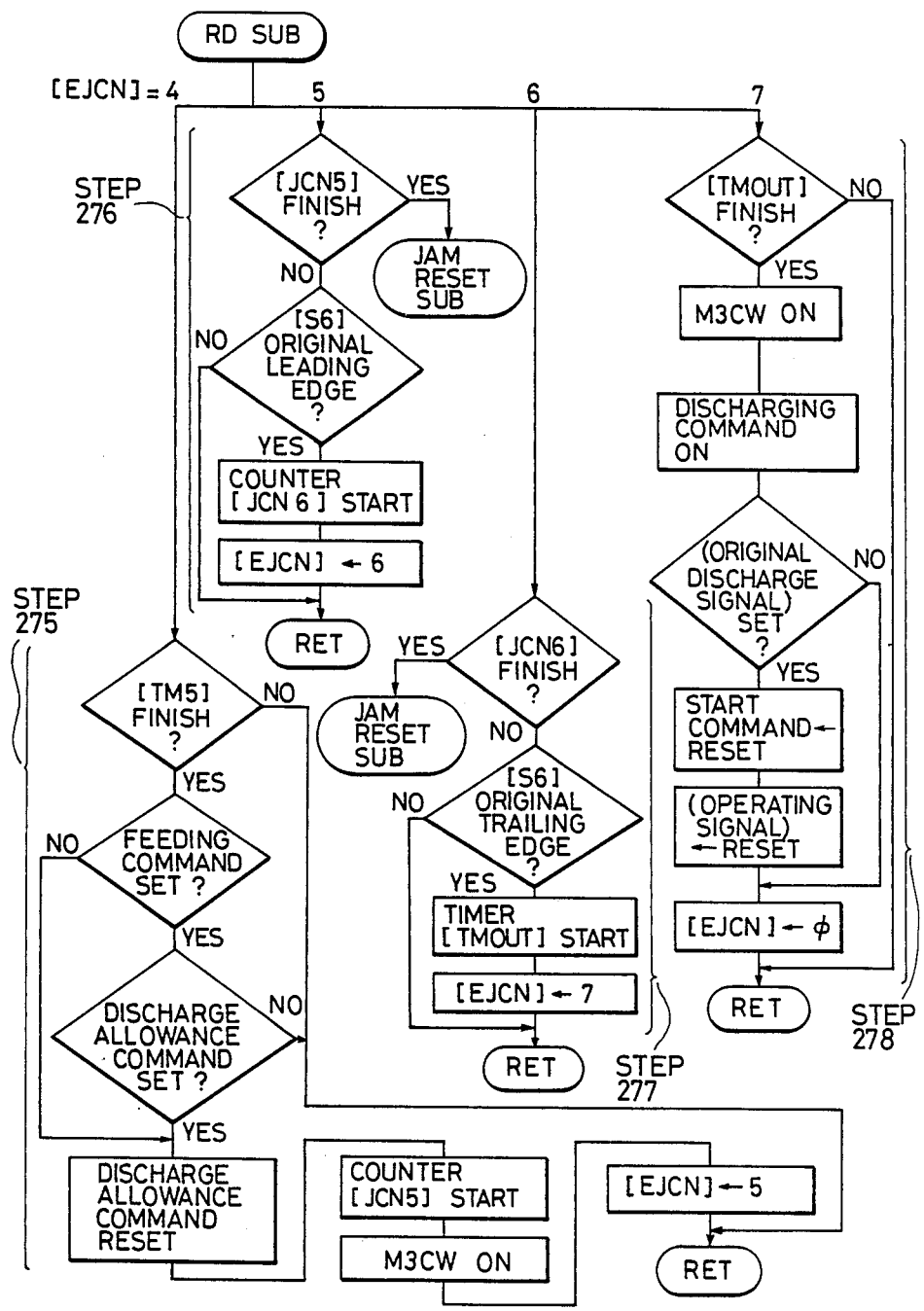

Now there will be explained the reversed-feed-reversed-discharge operation in case of employing two originals, while making reference to the normal-feed subroutine shown in FIG. 22, the reversal subroutine shown in FIGS. 23 and 24, and a flow chart of the reversed-discharge subroutine shown in FIG. 26. After two originals are placed on the original carrier tray 1, the reversed-feed-reversed-discharge operation in a step 224 of FIG. 21 when the copier selects the reversed-feed-reversed-discharge mode and sets the original feed signal. The first original is fed according to the normal-feed subroutine shown in FIG. 22 along the paths Ia and IIa, and, when it is placed in the determined position on the platen glass of the copier, the reversal enable command is set in a step 239, whereby the program proceeds to the reversal subroutine shown in FIGS. 23 and 24.

In FIG. 23, as a table counter TRNCN is equal to zero, the program proceeds to a step 241 to initiate the reversing operation by checking the setting of the reversal enable command, to set the inversion enable command, to set the reversing command, to turn on the signal SL for energizing the path switching solenoid, to start an interval timer TM4 and to step up the table counter TRNCN to "1". Upon expiration of said timer TM4, a step 242 turns off the driving signal BK for the brake 92, turns on the driving signal CL for the clutch 85 and steps up the table counter TRNCN to "2". A step 243 checks the status of the discharging command and awaits the completion of the discharge operation. In this state said command is reset since the first original is being transported. Therefore the signal MICCW is turned on to start the inverted drive of the belt 8 whereby the original proceeds along the paths IIIa and IVa. Then a jam counter JCN3 is started for measuring the time to the sensor S5, and the table counter TRNCN is stepped up to "3". A next step 244 discriminates whether the sensor S5 (17) detects the leading end of the original before the expiration of the jam counter JCN3, and, if said counter expires without said detection, a delay jamming is identified and the program proceeds to the JAM RESET subroutine. If the detection is obtained in normal manner, the signal M3CCW is turned on to rotate the rollers 9, 9a, then a jam counter JCN4 is started for measuring the time required by the original to pass through the sensor S5, and the table counter TRNCN is stepped up to "4". A step 245 discriminates whether the sensor S5 detects the trailing end of the original before the expiration of the jam counter JCN4, and, if said counter expires without said detection, a stay jamming is identified and the program proceeds to the JAM RESET subroutine. On the other hand, if the operation is normal, the signals M3CCW, M1CCW, CL, SL and CS are all turned off to interrupt the original transportation in the path IVa, then an interval timer TM5 is started and the table counter TRNCN is stepped up to "5". A step 246 turns on the signal M3CW upon expiration of the interval timer TM5 to rotate the rollers 9, 9a thereby advancing the original to the path Va, then starts a jam counter JCN5 for measuring the time to the sensor S6 (18) and steps up the table counter TRNCN to "6". A step 247 discriminates whether the sensor S6 detects the leading end of the original before the expiration of the jam counter JCN5, and, if said counter expires without said detection, a delay jamming is identified and the program proceeds to the JAM RESET subroutine. On the other hand, if the operation is normal, the original proceeds, from the rollers 10, 10a to the rollers 11, 11a through the path VIa. Then a jam counter JCN6 for measuring the time required by the original to pass through the sensor S6, and the table counter TRNCN is stepped up to "7". A step 248 discriminates whether the sensor S6 detects the trailing end of the original before the expiration of the jam counter JCN6, and, if said counter expires without said detection, there is identified a stay jamming and the program proceeds to the JAM RESET subroutine. On the other hand, if the operation is normal, the signal M3CW is turned off to stop the original in the path VIa, then an interval timer TM6 is started and the table counter TRNCN is stepped up to "8". A step 249 turns on the signals M3CCW, CL and SL upon expiration of said interval timer TM6 thereby advancing the original to the path VIIa by means of the rollers 10, 10a, also starts a jam counter JCN7 for measuring the time to the sensor S4, and steps up the table counter TRNCN to "9". Referring to FIG. 24, a step 251 discriminates whether the sensor S4 detects the leading end of the original before the expiration of the jam timer JCN7, and, if said timer expires without said detection, there is identified a delay jamming and the program proceeds to the JAM RESET subroutine. On the other hand, if the operation is normal, a jam counter JCN8 is started for measuring the time to the sensor S3, the signal M1CW is turned on and the table counter TRNCN is stepped up to "10". A step 252 discriminates whether the sensor S3 detects the leading end of the original proceeding in the path VIIa before the expiration of the jam counter JCN8, and, if said counter expires without said detection, there is identified a delay jamming and the program proceeds to the JAM RESET subroutine. On the other hand, if the operation is normal, a jam timer JCN9 is started to measure the time required by the original to pass through the sensor S3, and the table counter TRNCN is stepped up to "11". A step 253 discriminates whether the sensor S3 detects the trailing end of the original before the expiration of the jam counter JCN9, and, if said counter expires without said detection, a stay jamming is identified and the program proceeds to the JAM RESET subroutine. On the other hand, if the operation is normal, the original leaves the rollers 6, 6b and proceeds in the path IIa by means of the belt 8. At this point the signal CS is turned on to shift the clock signals entering the interruption port INT from the transport clock signals to the belt clock signals, then a registration counter RGCN2 corresponding to the transport distance to the determined position on the platen glass of the copier is started without change in the relationship between the clock signals and the transport distance, and the table counter TRNCN is stepped up to "12". Upon expiration of the registration counter RGCN2, a step 254 turns off the signals M1CW and CL and turns on the signal BK to achieve exact stop position, then resets the reversing command and also resets the table counter TRNCN to zero. In this manner the reversal operation is completed.

In this state the reversed feed sequence is terminated, and the program proceeds to the feed finish subroutine shown in FIG. 27. Subsequently the original feed finish signal is set as explained before to start the copying operation in the copier for the first original.

In the following there will be explained the reversed discharge operation for the first original and the reversed feed operation for the second original after the completion of the copying operation for the first original. Upon completion of the copying operation, the copier sets the original feed signal, and, since the reversed-feed-reversed-discharge mode is selected, a step 224 shown in FIG. 21 is executed to start the reversed discharge operation for the first original. In the reversed discharge subroutine shown in FIG. 26, there is executed a step 271 as a table counter EJCN is equal to zero. Since the discharge enable command is set in the step 234 shown in FIG. 22, the step 271 resets the discharge enable command, feed enable command and reversal enable command to prohibit the normal feed and reversal, sets the discharging command, turns on the signal SL to guide the discharged original to the path IIIa, starts the interval timer TM4 and steps up the table counter EJCN to "1". A next step 272 turns on the signal M1CCW and CL, upon expiration of the interval timer TM4, to initiate the original discharge along the path IIIa, then starts a jam counter JCN3 for measuring the time to the sensor S5, and steps up the table counter EJCN to "2". A step 273 discriminates whether the sensor S5 detects the leading end of the original before the expiration of the jam counter JCN3, and, if it expires without said detection, there is identified a delay jamming and the program proceeds to the JAM RESET subroutine. On the other hand, if the operation is normal, the signal M3CCW is turned on to drive the rollers 9, 9a thereby advancing the original along the path IVa, then a jam counter JCN4 is started for measuring the time required by the original to pass through the sensor S5, and the table counter EJCN is stepped up to "3". A step 274 discriminates whether the sensor S5 detects the trailing end of the original before the expiration of the jam counter JCN4, and, if it expires without said detection, there is identified a stay jamming and the program proceeds to the JAM RESET subroutine. On the other hand, if the operation is normal, the signals M3CCW, M1CCW, CL, SL and CS are turned off to stop the original in the path IVa. Simultaneously the feed enable command is set to initiate the reversed feed operation of the second original, thus resolving the standby state of the step 231 shown in FIG. 22, and the feeding command is set to initiate the separation of the second original. Then an interval timer TM5 is started, and the table timer EJCN is stepped up to "4". A step 275 enters a standby state, until the setting of the feeding command and the discharge enable command after the expiration of the interval timer TM5. On the other hand the feeding of the second original proceeds, and the discharge enable command is set at the step 234 shown in FIG. 22. Therefore, a step 275 resets the discharge enable command, turns on the signal M3CW to guide the discharged original from the path IVa to Va, starts a jam timer JCN5 for measuring the time to the sensor S6, and steps up the table counter EJCN to "5". A step 276 discriminates whether the sensor S6 detects the leading end of the original before the expiration of the jam timer JCN5, and, if it expires without said detection, there is identified a delay jamming and the program proceeds to the JAM RESET subroutine. On the other hand, if the operation is normal, the original proceeds to the path VIa through the rollers 10, 10a, then a jam counter JCN6 for measuring the time required by the original to pass through the sensor S6, and the table counter is stepped up to "6". A step 277 discriminates whether the sensor S6 detects the trailing end of the original before the expiration of the jam counter JCN6, and, if it expires without said detection, there is identified a stay jamming and the program proceeds to the JAM RESET subroutine. On the other hand, if the operation is normal, the original proceeds along the path VIa to reach the rollers 11, 11a, then a post-rotation timer TMOUT is started, and the table counter EJCN is stepped up to "7". Upon expiration of said timer TMOUT, a step 278 turns of the signal M3CW, stops the discharge drive, resets the discharging command and resets the table counter EJCN to zero as explained before, whereby the program returns to the step 271 and enters the standby state. On the other hand, the feeding process, awaiting the resetting of the discharging command in the step 243 in FIG. 23, re-starts the reversal operation, then executes the feed finishing operation from the step 281 shown in FIG. 27, and instructs a copying operation for the second original to the copier.

The reversed discharge operation for the second original executes the discharging operation alone since the original discharge signal is set by the copier as explained before. Thus the steps 271 to 278 in the reversed discharge subroutine in FIG. 26 are executed, and a step 278 resets the start command and the operating signal because of the set state of the original discharge signal, thus terminating all the operations.

Figure 28:
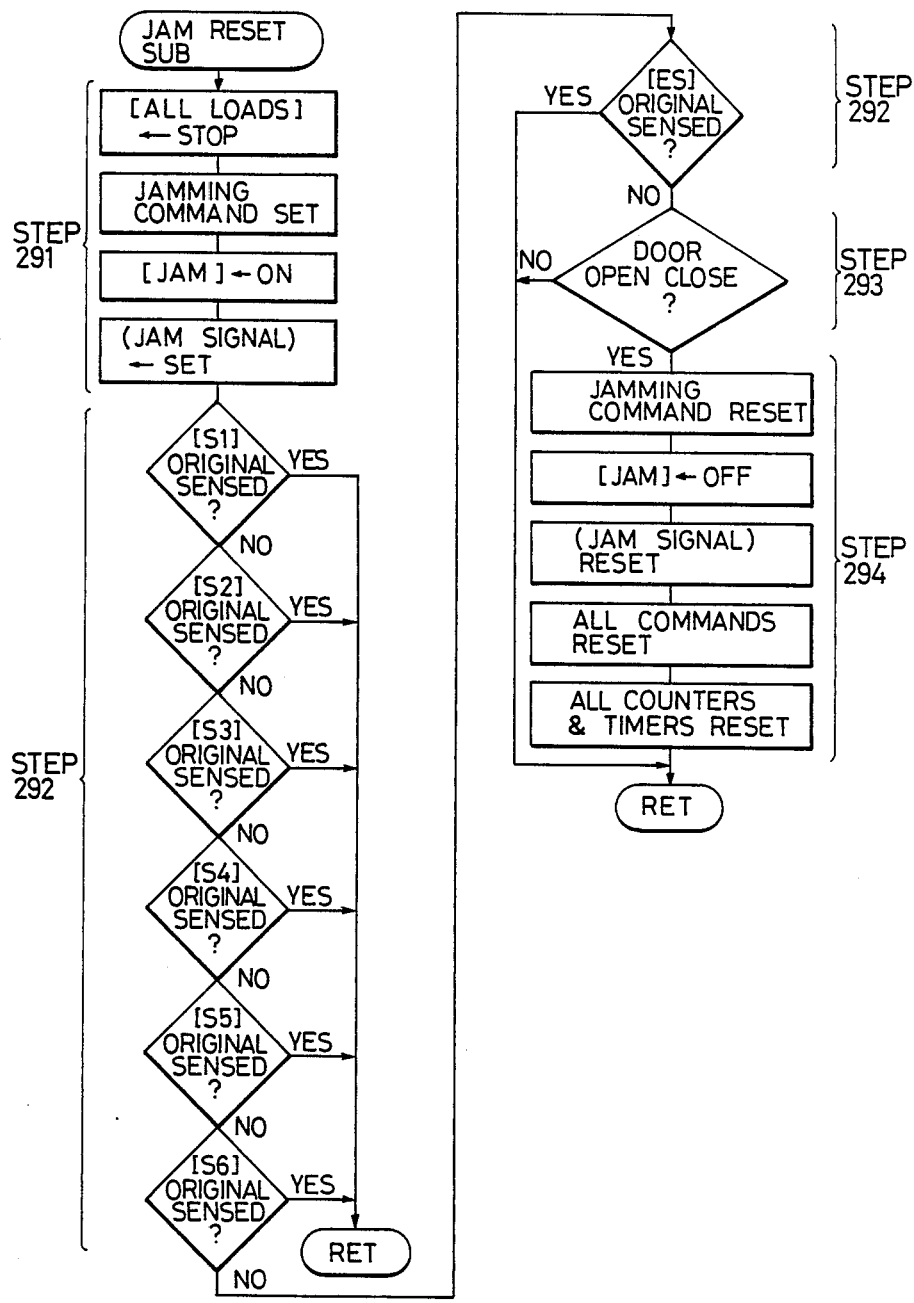

Now there will be explained the JAM RESET subroutine. Referring to FIG. 28, a step 291 turns off all the loads, sets the jamming command, turns on a signal JAM from the output port 011 and turns on a jam lamp 24. Then it sets the JAM signal in the serial data. Subsequently a step 292 identifies whether any of the sensors S1–S6, ES detects the original, and, in the presence of any detection, the program does not proceed to that next step. It proceeds to a step 293 when the operator removes all the originals to turn off all the detection signals from the sensors. The step 293 identifies the door manipulation by the operation, and a step 294 resets the jamming command, turns of the JAM signal from the output port 011, resets the JAM signal, JAM signal, all the counters and timers to complete the JAM RESET operation.

Now there will be explained the original size detecting procedure conducted by the SIZECK subroutine shown in FIG. 31. A fed original is counted by the original size counter during the detection thereof by the sensor S2 in response to the transport clock and belt clock signals, namely from the leading end to the trailing end, and data corresponding to the size are stored. The original size is identified by comparing said data with those of predetermined sizes from A3 size to B5 size. As an example the A4 size is identified from a relationship B5R>original size counter≧A4 data, and a signal "1" is set in the original size signal of the serial data to be supplied to the copier. After the size is discriminated, the original size counter is cleared for the detection of the size of a next original, so that the original size is checked for each original fed. In case the original after the size detection is subjected to an inversion or discharge operation, each sensor is provided with a stay jamming counter, and an exact stay jam detection is rendered possible by providing the data of said counter with an additional margin.

Figure 29B:
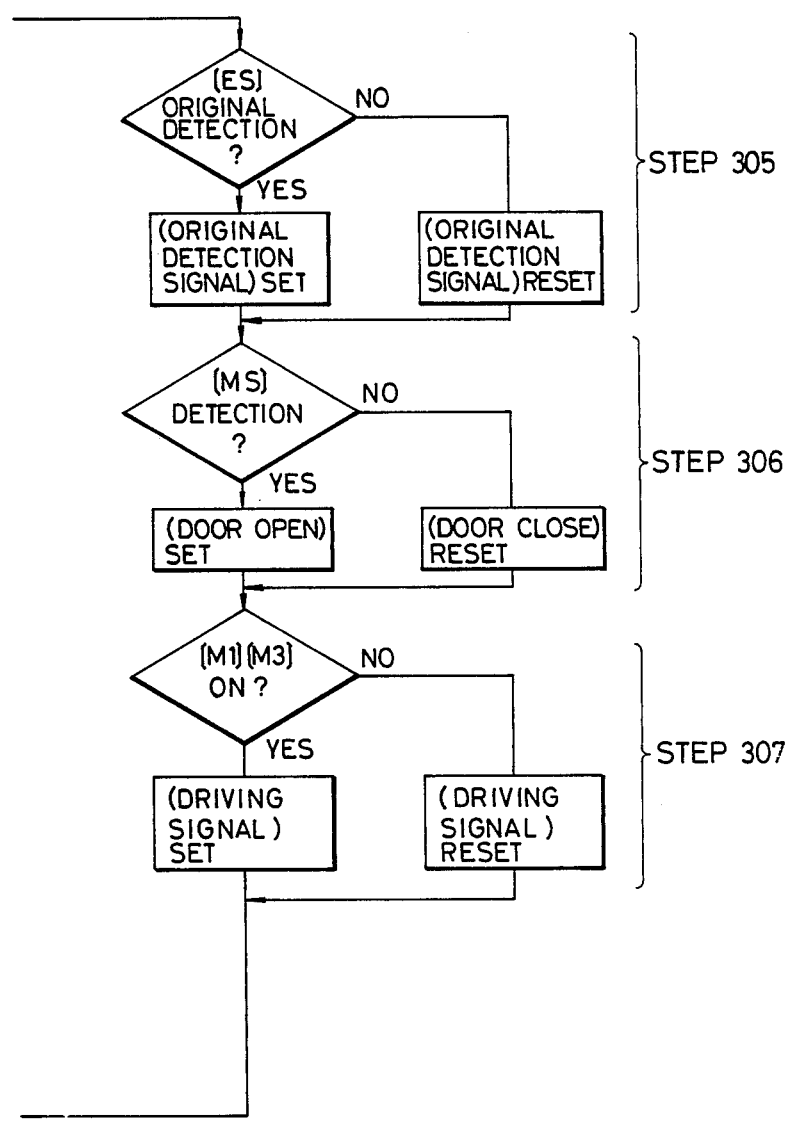
Figure 30:
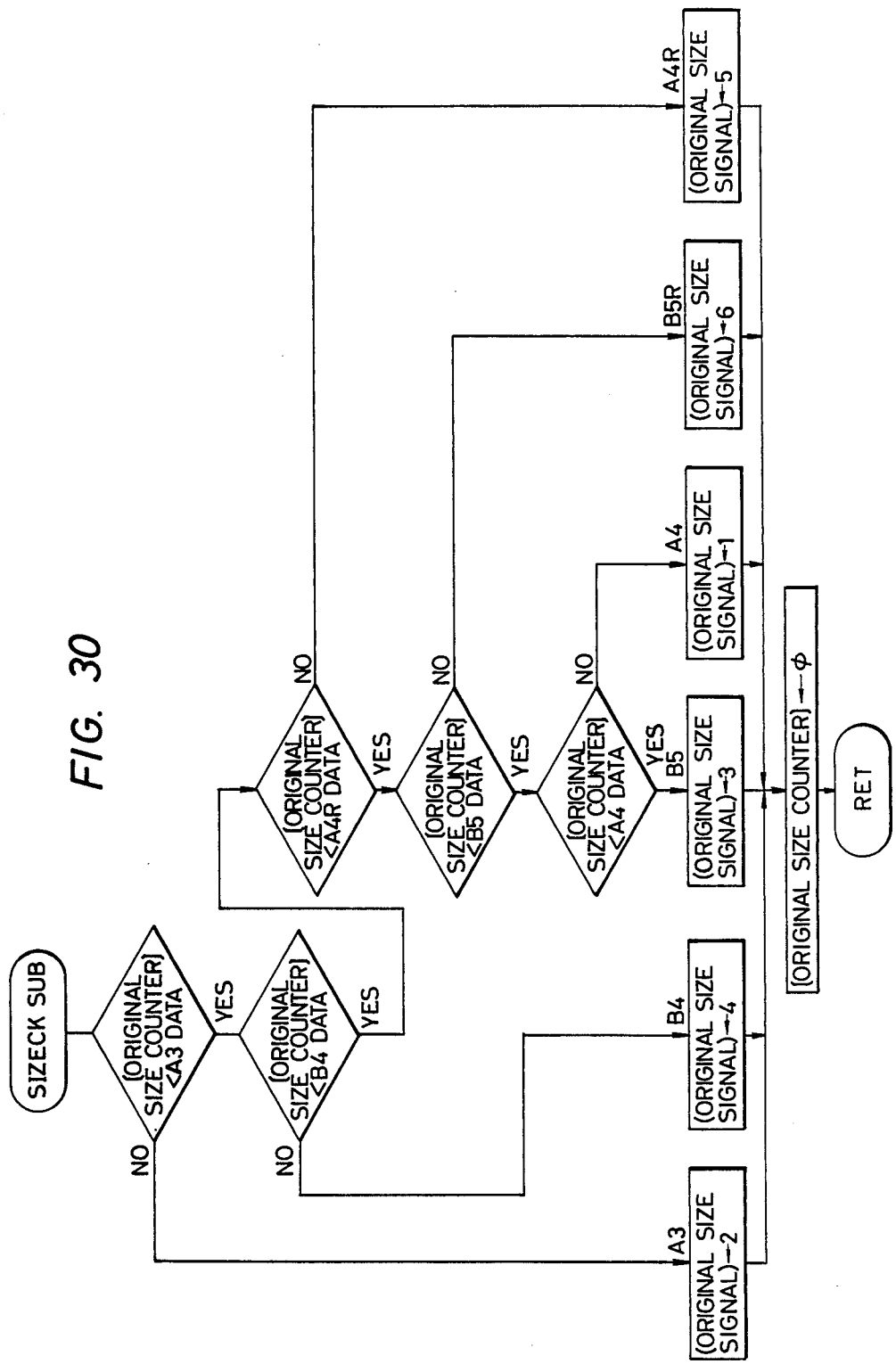

Now there will be explained the serial transfer process, with reference to FIG. 29 showing a flow chart for serial communication with the aforementioned main unit. A step 301 checks the entry of a request signal REQ from the main unit for requesting the serial communication, and initiates the serial communication in response to said entry. A step 302 stores, in a data register SiREG for supplying data to the port SO of the microcomputer 120 for data transmission to the main unit, the aforementioned 8-bit serial data (FLDO1) (FLDO2) (FLDO3) according to the content of a counter SOCN, supplies the content of said register SiREG to the port SO, and turns on the acknowledge signal ACK for informing the main unit that it is ready for serial communication. The serial communication between the main unit B and the present apparatus A is automatically conducted according to the μCOM43N, and 8-bit data are exchanged until the end of communication is checked in a step 303. Upon termination of the serial communication, a step 304 turns off the acknowledge signal ACK, and the data from the main unit received by the port S1 of the microcomputer 120 are stored in the register SiREG, of which content is then stored in the aforementioned FLDi1. Also the content of said counter SOCN is stepped up, and, if SOCN=3, it is again reset to zero. In this manner the content of SOCN is renewed for each serial communication, so that the serial communication data to be stored in the register SiREG are cyclically changed in the order of FLDO1, FLDO2, FLDO3, . . .

In the absence of the request signal REQ in the step 301, the serial communication is not conducted, and the program proceeds to steps 305, 306 and 307 to set/reset the data of (FLDO1) (FLDO2) (FLDO3).

The step 305 sets or resets the data (original detection signal) in FLDO2 according to whether the original sensor ES (20) detects an original. The step 306 sets or resets the data (door open signal) in FLDO3 according to whether the switch MS (126) provides the detection signal. The step 307 sets or resets the data (driving signal) in FLDO1 according to whether the motors M1 (82) and M2 (97) are driven.

Figure 31:
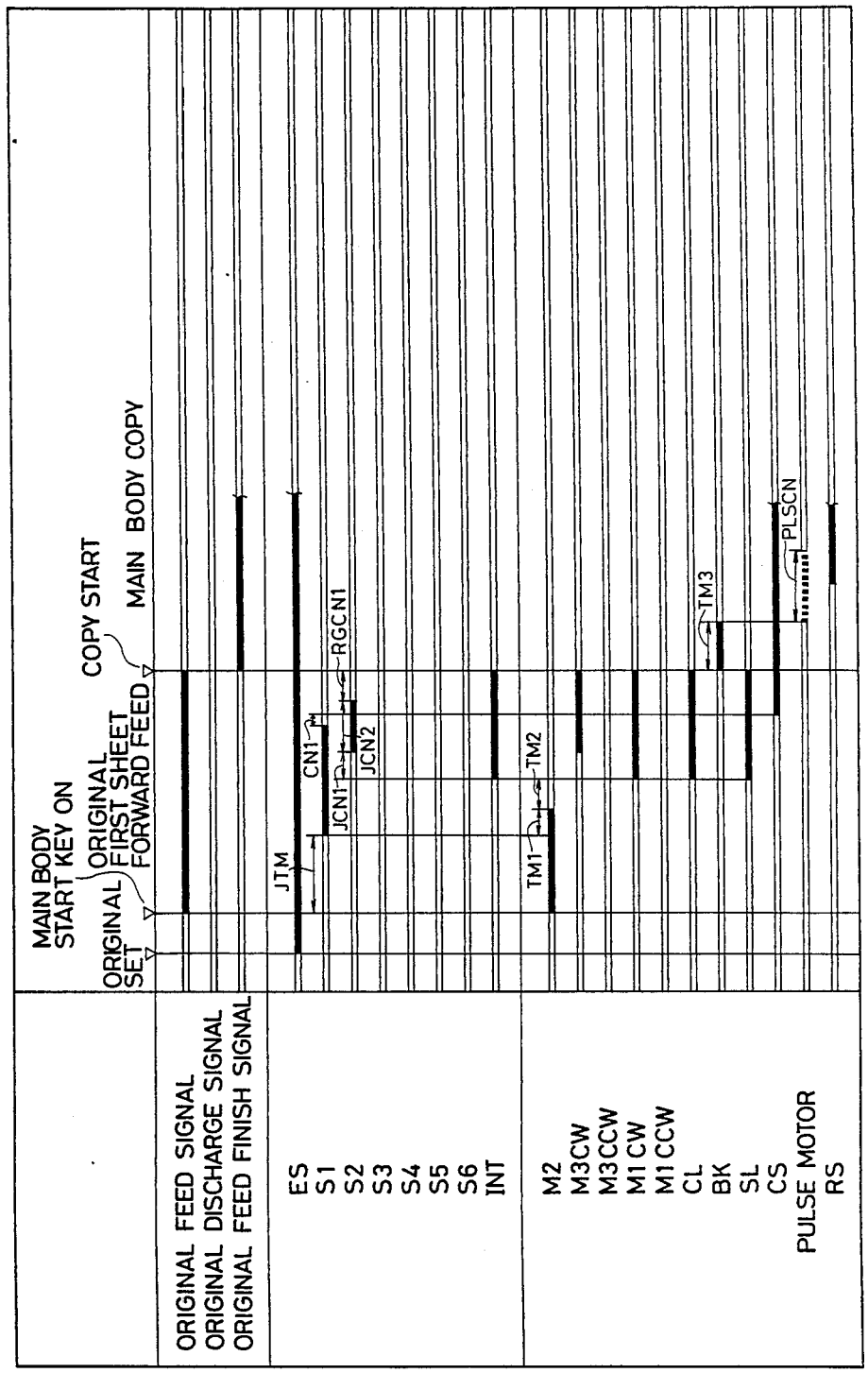
Figure 32:
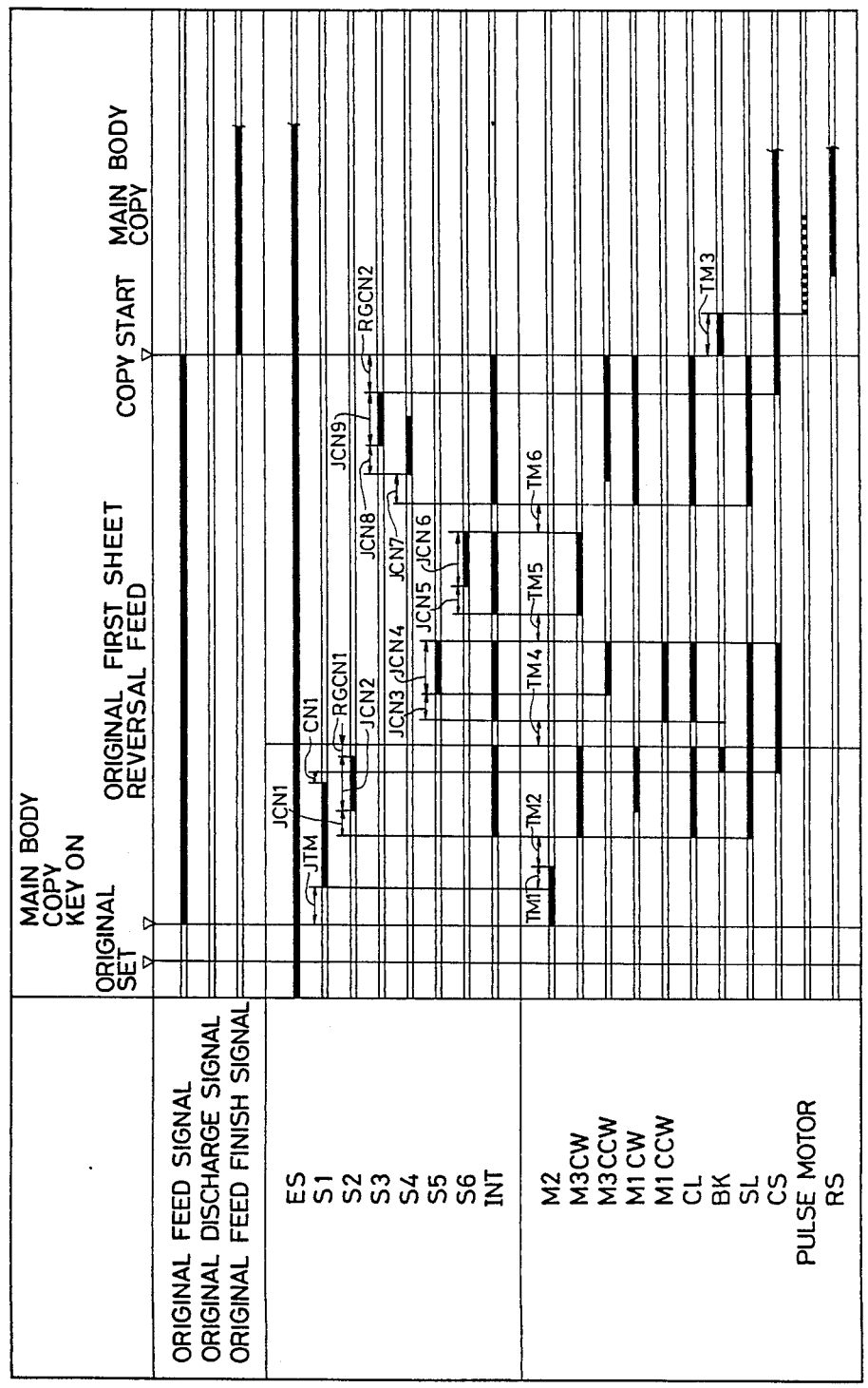
Figure 33:
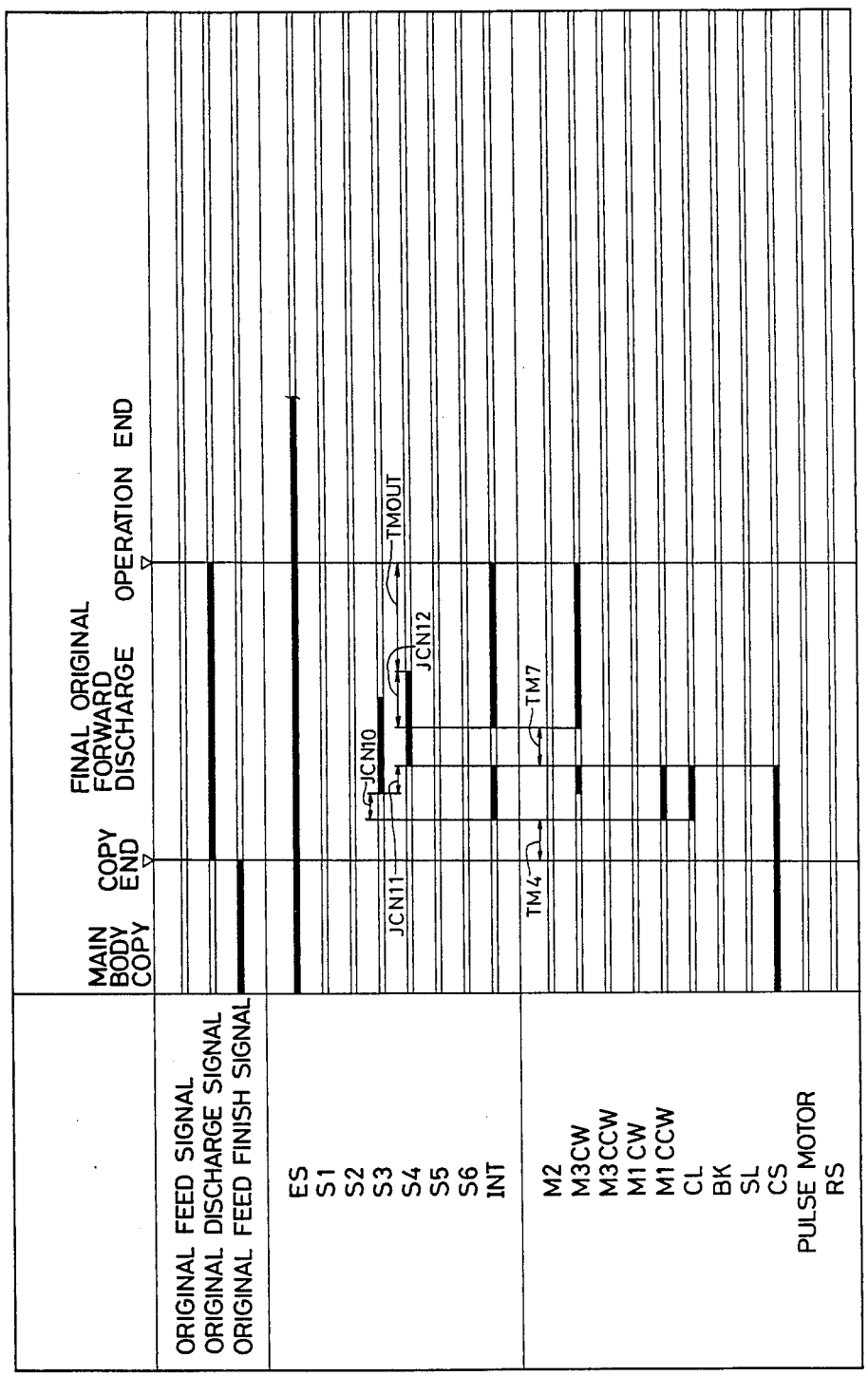
Figure 34:
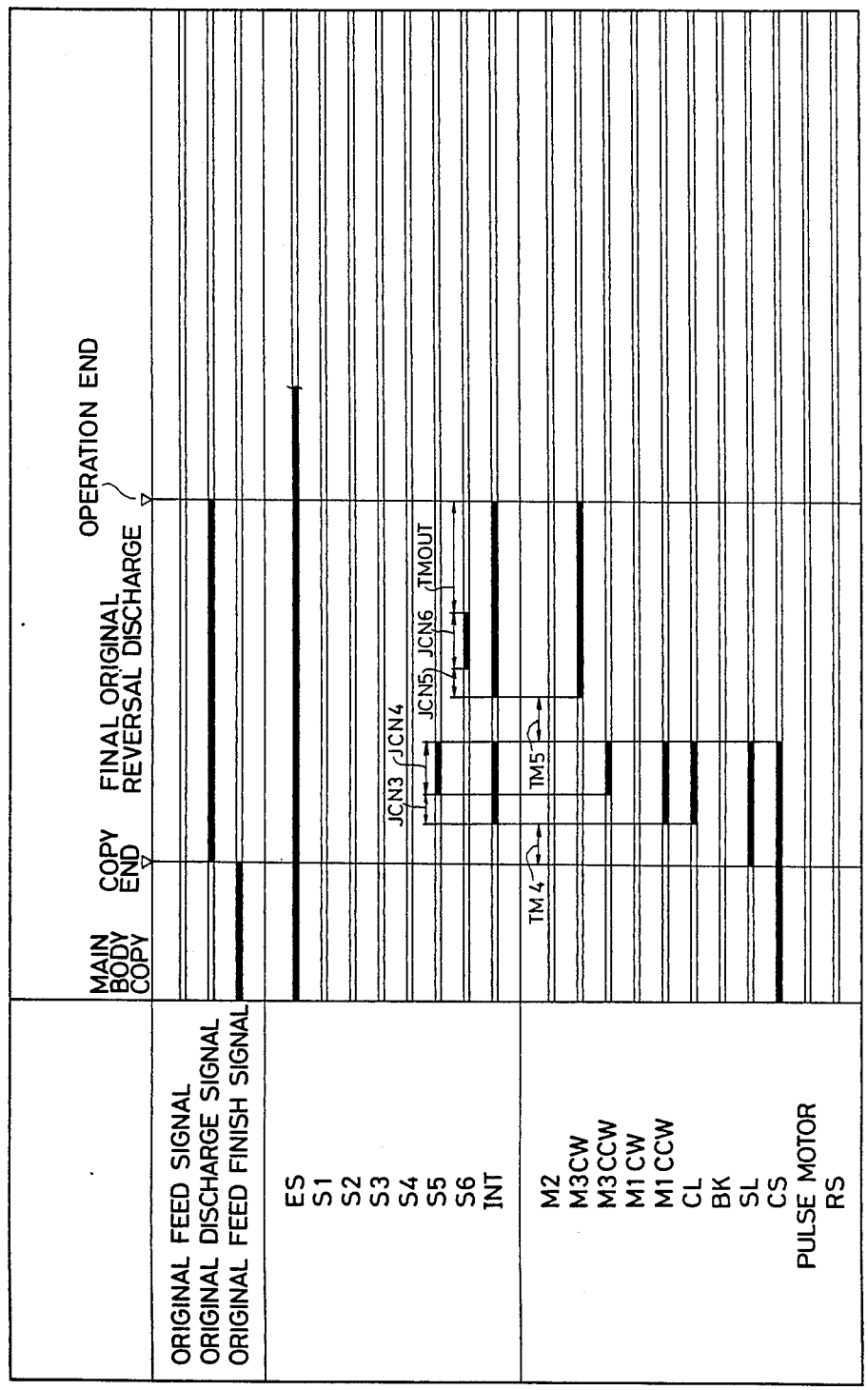
Figure 35:
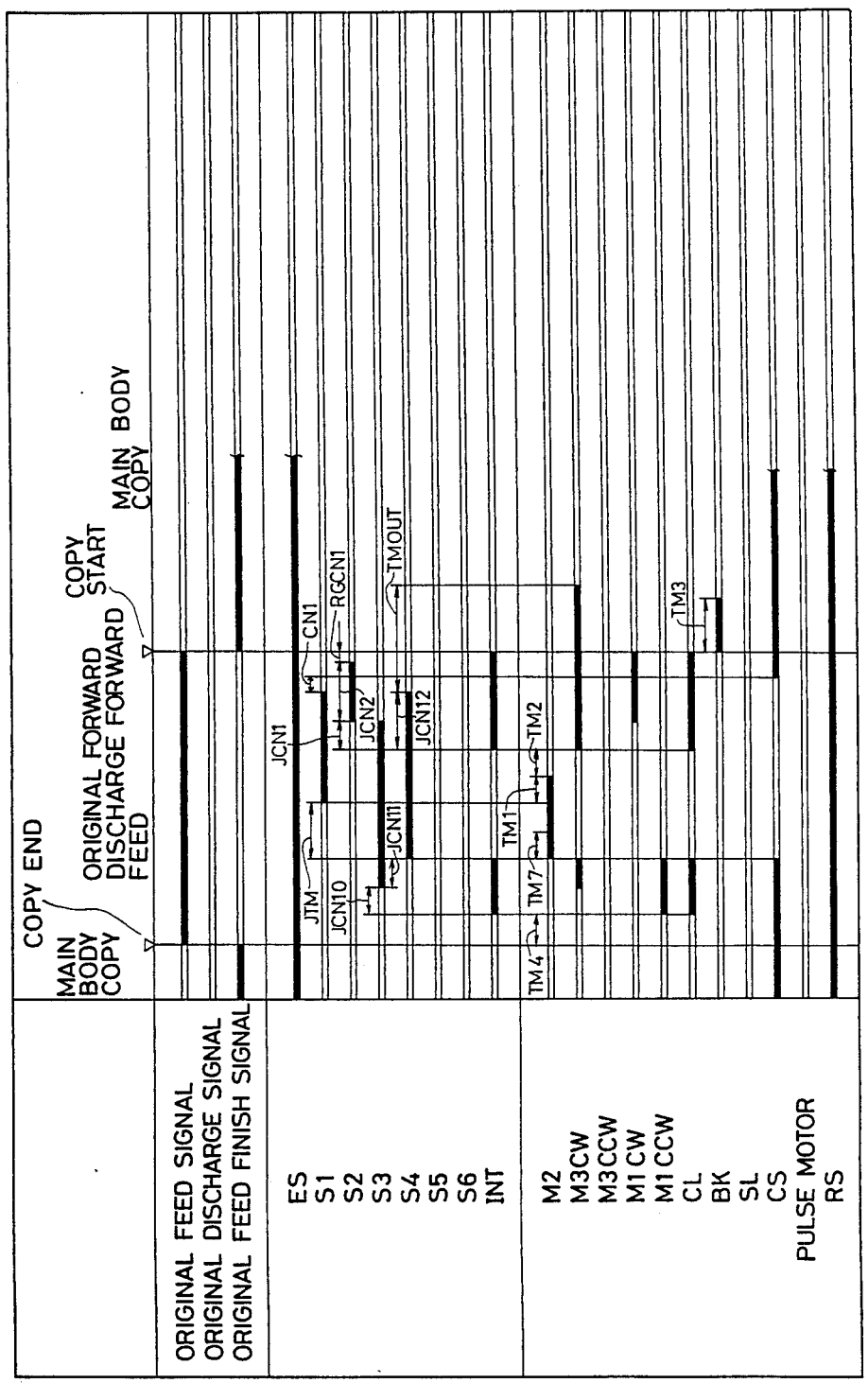
Figure 36:
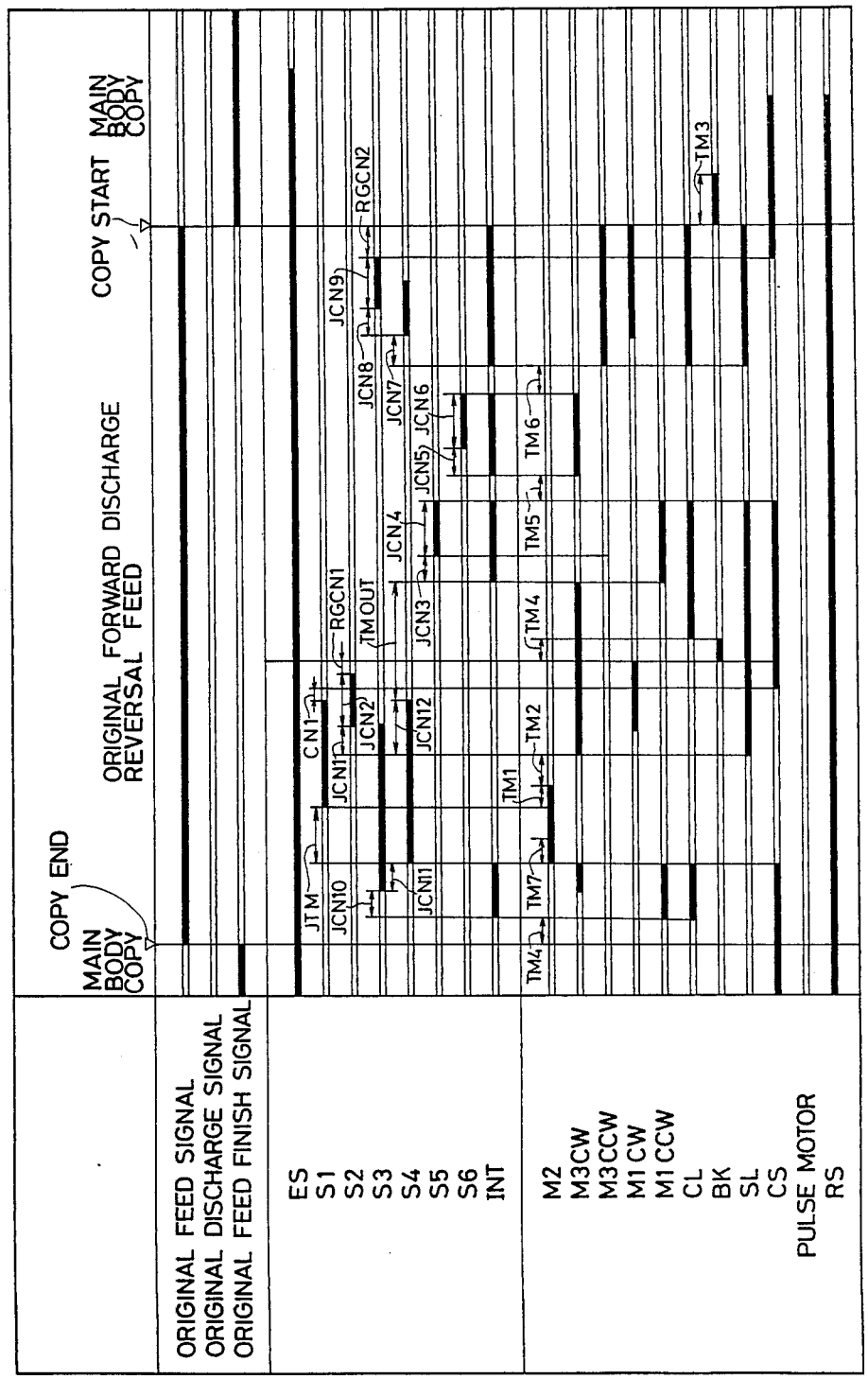
Figure 37:
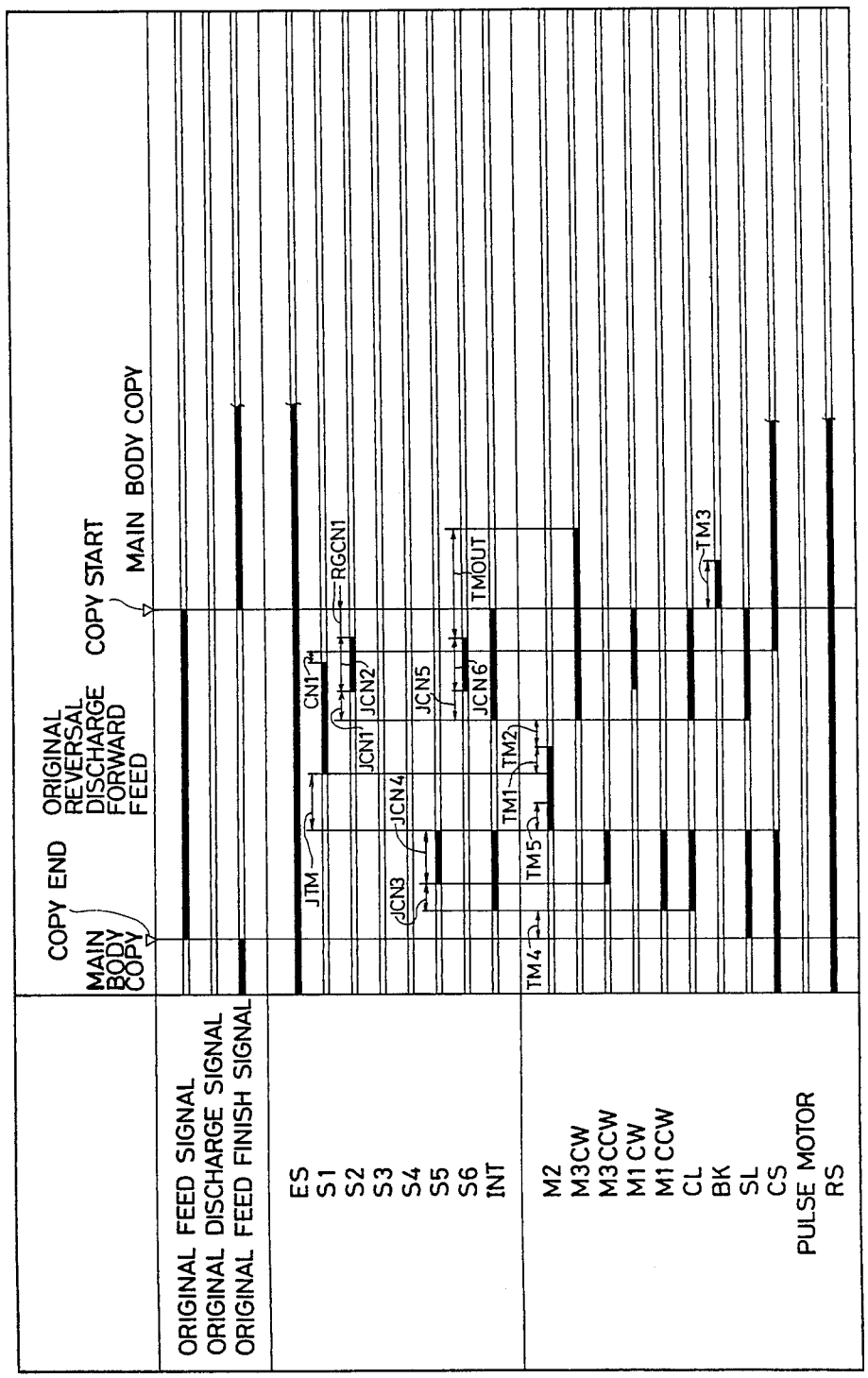
Figure 38:
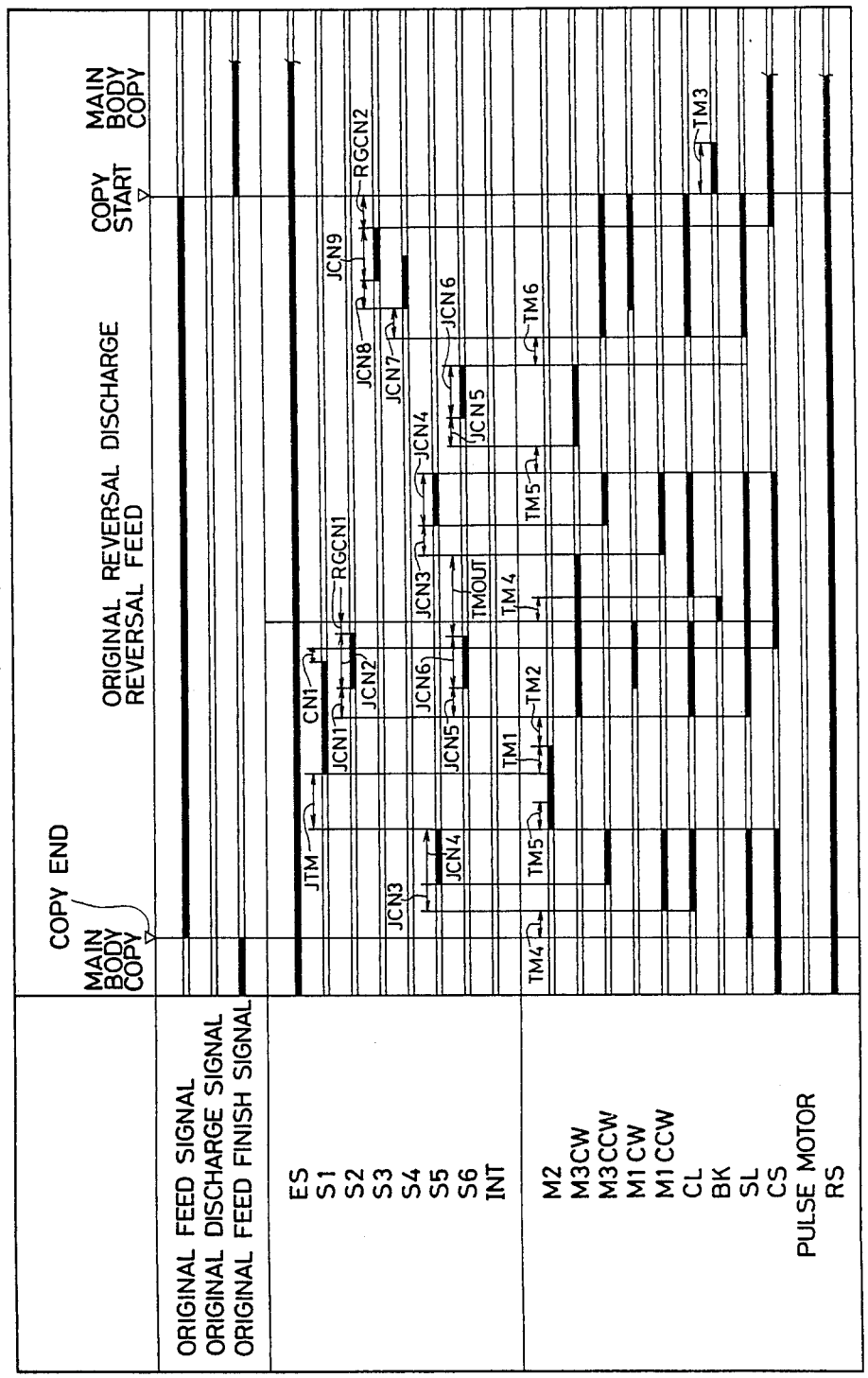

FIGS. 31 to 39 are timing charts of the various parts of the feeding apparatus in each of the operating modes according to the above-explained flow charts, wherein FIG. 31 represents a case of normal feed of the first original, FIG. 32 is a case of reversed feed of the first original, FIG. 33 is a case of normal discharge of the last original, FIG. 34 is a case of reversed discharge of the last original, FIG. 35 is a case of normal feed and normal discharge of the originals, FIG. 36 is a case of reversed feed and normal discharge of the originals, FIG. 37 is a case of normal feed and reversed discharge of the originals, FIG. 38 is a case of reversed feed and reversed discharge of the originals, and FIG. 39 is a case of inversion of the original.

The reflective sensors in the foregoing embodiment may be replaced by transmission sensors, microswitches, lead switches etc.

In the foregoing embodiment the counter is composed of a software utilizing the interruption port INT of the microcomputer, but it can also be composed of a hard logic circuit utilizing a counter IC.

Furthermore, in the foregoing embodiment, the interruption port receives only one clock signal selected by switching means, but the objects of the present invention are also achievable by entering all the clock signals into the input ports and selecting said signals in the software of the microcomputer.

Besides the clock signals may be generated for example by a pulley rotated by the transported original instead of the movement of the transporting means.

What is claimed is:

1. An original feeding apparatus comprising:
    transport means for feeding an original to an exposure position and discharging the same therefrom after exposure;
    reversing means for reversing the original; and
    control means adapted for controlling said transport means and reversing means to achieve a first mode in which the original is fed to said exposure position and is discharged therefrom after the exposure, and a second mode in which the original is fed to said exposure position for exposure of a first side thereof, then is reversed by said reversing means at a same side of said exposure position where the original feeding and discharging are performed and supplied again to said exposure position for exposure of a second side thereof, and discharged therefrom,
    wherein said control means is adapted to control said transport means in such a manner that while the discharge of an original after exposure is conducted, the feed of a next original is initiated.

2. An original feeding apparatus according to claim 1, wherein said control means is adapted to control said transport means and said reversing means, in case of copying two-sided original onto two sides of a copying material in said second mode, in such a manner that the original is fed to said exposure position after reversal by said reversing means in the feed for exposure of the first side.

3. An original feeding apparatus according to claim 1, further comprising supporting means for supporting the originals, wherein said transport means is adapted to feed the originals from said supporting means and to discharge the same to said supporting means.

4. An original feeding apparatus comprising:
supporting means for supporting originals;
transport means for feeding the original from said supporting means to an exposure position, and, after exposure, discharging the original after exposure from said exposure position to said supporting means;
reversing means for reversing the original;
selecting means for selecting one of plural operation modes of feed and discharge of the originals, said selecting means being able to change an operation mode in a predetermined timing when the original supported by said supporting means is fed and the original at the exposure position is discharged; and
control means for controlling said transport means and reversing means according to the operation mode selected by said selecting means, wherein said control means is adapted to determine whether or not to reverse the original by said reversing means in the feed to said exposure position, and whether or not to reverse the original by said reversing means in the discharge from said exposure position,
wherein said control means is adapted to control said transport means in such a manner that while the discharge of an original after exposure is conducted, the feeding of a next original is initiated.

5. An original feeding apparatus according to claim 4, wherein one of said operation modes is a normal-feed and normal-discharge mode in which the originals are fed and discharged without reversal by said reversing means.

6. An original feeding apparatus according to claim 4, wherein one of said operation modes is a reversed-feed and normal-discharge mode in which the original is fed to said exposure position after reversal by said reversing means and is discharged from said exposure position without reversal by said reversing means.

7. An original feeding apparatus according to claim 4, wherein one of said operation modes is a normal-feed and reversed-discharge mode in which the original is fed to said exposure position without reversal by said reversing means and is discharged from said exposure position after reversal by said reversing means.

8. An original feeding apparatus according to claim 4, wherein one of said operation modes is a reversed-feed and reversed-discharge mode in which the original is fed to said exposure position after reversal by said reversing means and discharged from said exposure position after reversal by said reversing means.

9. An original feeding apparatus according to claim 5, wherein said selecting means is adapted to select said normal-feed and normal-discharge mode in case of copying one-sided originals onto one side or two sides of a copying material.

10. An original feeding apparatus according to claim 6, wherein said selecting means is adapted to select said reversed-feed and normal-discharge mode in case of copying two-sided originals onto one side or two sides of a copying material.

11. An original feeding apparatus according to claim 10, wherein said control means is adapted to change said operation mode at each end of a copying operation for an original.

12. An original feeding apparatus comprising:
supporting means for supporting an original;
feeding means for feeding the original supported by said supporting means to an exposure position, said feeding means being operable to reverse and feed the original in such a way that a condition of the original in said supporting means and a condition of the original in said exposure position are the same as each other;
discharge means for discharging the original after the exposure from said exposure position, said discharge means and said feeding means being arranged so as to perform feeding, discharging, and reversing of the original at the same side of said apparatus; and
control means for controlling said feeding means in such a manner that while the discharge of the original is conducted, the feed of a next original is initiated.

* * * * *

UNITED STATES PATENT AND TRADEMARK OFFICE
CERTIFICATE OF CORRECTION

PATENT NO. : 4,811,049
DATED : March 7, 1989
INVENTOR(S) : TAKESHI HONJO, ET AL.

It is certified that error appears in the above-identified patent and that said Letters Patent is hereby corrected as shown below:

Drawing

Sheet 9, "CLATCH" should read --CLUTCH--.

Column 2, line 2, "other" should read --other hand--;

line 16, "specy" should read --species--.

Column 6, line 16, "reserved" should read --reversed--.

Column 7, line 1, "an" should read --a--.

Column 10, line 8, "represent" should read --represents--.

Column 11, line 25, "if" should read --, but, if--.

Column 12, line 12, "an" should read --a--;

line 15, "an" should read --a--;

line 17, "an" should read --a--;

line 22, "counter 214" should read --counter MDCN--.

Column 13, line 19, "03, 06, 08, 010" should read --O3, O6, O8, O10--;

line 42, "013" should read --O13--.

UNITED STATES PATENT AND TRADEMARK OFFICE
CERTIFICATE OF CORRECTION

PATENT NO. : 4,811,049

DATED : March 7, 1989

INVENTOR(S) : TAKESHI HONJO, ET AL.

It is certified that error appears in the above-identified patent and that said Letters Patent is hereby corrected as shown below:

Column 14, line 38, "controls" should read --control--.

Column 15, line 66, "suspend" should read --suspending--.

Column 16, line 9, "stae" should read --state--.

Column 19, line 64, "signal" should read --signals--.

Column 20, line 24, "timer" should read --counter--;

line 43, "counter" should read --counter EJCN--;

line 54, "of" should read --off--.

UNITED STATES PATENT AND TRADEMARK OFFICE
CERTIFICATE OF CORRECTION

PATENT NO. : 4,811,049
DATED : March 7, 1989
INVENTOR(S) : TAKESHI HONJO, ET AL.

It is certified that error appears in the above-identified patent and that said Letters Patent is hereby corrected as shown below:

Column 21, line 7, "011" should read --O11--;

line 11, "that" should read --the--;

line 15, "operation," should read --operator,--;

line 16, "of" should read --off--;

line 17, "011" should read --O11--; same line, "JAM signal" (second occurrence) should be deleted.

Signed and Sealed this

Twenty-second Day of August, 1989

Attest:

DONALD J. QUIGG

Attesting Officer    Commissioner of Patents and Trademarks